US010635795B2

(12) United States Patent
Tsou

(10) Patent No.: US 10,635,795 B2
(45) Date of Patent: Apr. 28, 2020

(54) DYNAMIC GRAPHIC EYE-MOVEMENT AUTHENTICATION SYSTEM AND METHOD USING FACE AUTHENTICATION OR HAND AUTHENTICATION

(71) Applicant: UTECHZONE CO., LTD., New Taipei (TW)

(72) Inventor: Chia-Chun Tsou, New Taipei (TW)

(73) Assignee: Utechzone Co., Ltd., New Taipei (TW)

( * ) Notice: Subject to any disclaimer, the term of this patent is extended or adjusted under 35 U.S.C. 154(b) by 119 days.

(21) Appl. No.: 15/363,329

(22) Filed: Nov. 29, 2016

(65) Prior Publication Data

US 2017/0154177 A1 Jun. 1, 2017

(30) Foreign Application Priority Data

Dec. 1, 2015 (TW) .............................. 104140079 A
Dec. 21, 2015 (TW) .............................. 104142974 A
Dec. 28, 2015 (TW) .............................. 104144027 A

(51) Int. Cl.
*H04L 9/32* (2006.01)
*G06K 9/00* (2006.01)
(Continued)

(52) U.S. Cl.
CPC .............. *G06F 21/32* (2013.01); *G06F 21/36* (2013.01); *G06K 9/00127* (2013.01);
(Continued)

(58) Field of Classification Search
CPC ..... G06F 21/32; G06F 21/36; G06K 9/00597; G06K 9/00382; G06K 9/00127;
(Continued)

(56) References Cited

U.S. PATENT DOCUMENTS 6,243,076 B1 *  6/2001  Hatfield .................. G06F 3/013
                                                              345/156
8,827,808 B2 *  9/2014  Matsumaru ............. A63F 13/56
                                                              463/36
(Continued)

FOREIGN PATENT DOCUMENTS

CN      104156643 A      11/2014
TW       I434194 B        4/2014
TW       I473934 B        2/2015

*Primary Examiner* — Daniel B Potratz
*Assistant Examiner* — Vu V Tran
(74) *Attorney, Agent, or Firm* — Muncy, Geissler, Olds & Lowe, P.C.

(57) ABSTRACT

The present invention is a dynamic graphic eye-movement authentication system, comprising an image capturing device, a display device, and a control unit. The image capturing device is provided for capturing images of a user's eyes to obtain the user's gaze direction. The display device is for providing a display interface to user. The control unit has a graphic producing module, an eye-movement analyzing module, and a graphic authentication module, wherein the graphic producing module provides a plurality of dynamic graphics on the display interface, wherein the eye-movement analyzing module determines the user gaze direction according to the images of the user's eyes, wherein the graphic authentication module generates authentication-oriented input information according to the dynamic graphic selected by the user through the gaze direction and compares the authentication-oriented input information with user authentication information in an authentication database.

17 Claims, 21 Drawing Sheets

(51) Int. Cl.
    *G06F 21/32*  (2013.01)
    *G06F 21/36*  (2013.01)
(52) U.S. Cl.
    CPC ..... *G06K 9/00382* (2013.01); *G06K 9/00597* (2013.01); *G06K 9/00892* (2013.01); *G06K 2009/00932* (2013.01)
(58) Field of Classification Search
    CPC ........... G06K 9/00892; G06K 9/00604; G06K 9/00268; G06K 2009/00932
    See application file for complete search history.

(56) References Cited

U.S. PATENT DOCUMENTS

| | | | | |
|---|---|---|---|---|
| 2002/0057439 A1* | 5/2002 | Chae | ................ | G06K 9/00604 356/609 |
| 2004/0258274 A1* | 12/2004 | Brundage | ............. | G07D 7/128 382/100 |
| 2010/0201621 A1* | 8/2010 | Niikawa | ................. | G06F 3/013 345/158 |
| 2014/0126782 A1* | 5/2014 | Takai | ................... | G06K 9/0061 382/116 |
| 2014/0147002 A1* | 5/2014 | Park | ..................... | G06K 9/0061 382/103 |
| 2014/0256438 A1* | 9/2014 | Grant | ..................... | A63F 13/10 463/36 |
| 2014/0289834 A1* | 9/2014 | Lindemann | ........... | G06Q 20/42 726/7 |
| 2015/0062323 A1* | 3/2015 | Gustafsson | ............ | G06F 3/013 348/78 |
| 2015/0084864 A1* | 3/2015 | Geiss | ..................... | G06F 3/013 345/158 |
| 2015/0346810 A1* | 12/2015 | Urbach | ................... | G06F 3/013 345/156 |
| 2016/0062456 A1* | 3/2016 | Wang | ..................... | G06F 21/32 382/117 |
| 2017/0147864 A1* | 5/2017 | Ahn | ................... | G06K 9/00087 |
| 2018/0018514 A1* | 1/2018 | Azam | ..................... | G06F 21/36 |
| 2018/0321739 A1* | 11/2018 | Park | ................... | G06F 3/04817 |

* cited by examiner

DYNAMIC GRAPHIC EYE-MOVEMENT AUTHENTICATION SYSTEM AND METHOD USING FACE AUTHENTICATION OR HAND AUTHENTICATION

BACKGROUND OF THE INVENTION

1. Field of the Invention

The present invention relates to eye-movement authentication systems and methods and, more particularly, to an eye-movement authentication system and method using face authentication or hand authentication and displaying dynamic graphics.

2. Description of the Prior Art

User authentication entails verifying a user's identity by taking specific measures. The commonest conventional technique of user authentication is password authentication. Password authentication involves setting a password which contains numbers or graphics. The password is dedicated to a user or object and intended for use by the user. The password is suggestive of the user's authority or the authority of an object or data.

Password authentication works solely by passwords and thus depends thereon. Hence, password authentication has a drawback: passwords are susceptible to theft, and in consequence unauthorized use of passwords renders user authentication useless. Common ways passwords are stolen include recovery of fingerprints from keyboards and keylogging.

In attempt to solve the aforesaid problem, the prior art proposes tracking a user's eye movements while the user is entering a password. The aforesaid conventional technique requires apparatuses for tracking and measuring the positions of a user's eyeballs and capturing information pertaining to the user's eye movements, respectively, and enables the user to enter a password by watching at related positions on the screen, thereby preventing password theft. However, watching at related positions on the screen with a view to entering a password lays open to the chance that a user's eye-movement path will be recorded by a keylogging device, and in consequence the password displayed on the screen can be inferred by an eye-movement mode. In view of this, persons skilled in the art are confronted with the need to prevent passwords from being divulged as a result of keylogging carried out with a keylogging device.

SUMMARY OF THE INVENTION

It is an objective of the present invention to overcome a drawback of the prior art: passwords being entered by a user's eye movements are predisposed to theft, because the user's eye-movement path can be recorded with a keylogging device.

To solve the aforesaid drawback, the present invention provides a dynamic graphic eye-movement authentication system, comprising an image capturing device, display device, and control unit. The image capturing device is provided for capturing images of a user's eyes to obtain the user's gaze direction. The display device is for providing a display interface to the user. The control unit has a graphic producing module, an eye-movement analyzing module, and a graphic authentication module; the graphic producing module provides a plurality of dynamic graphics to be displayed on the display interface; the eye-movement analyzing module determines the user gaze direction according to the images of the user's eyes, and the graphic authentication module generates authentication-oriented input information according to the dynamic graphic selected by the user through the gaze direction and compares the authentication-oriented input information with user authentication information in an authentication database.

Another object of the present invention is to provide a dynamic graphic eye-movement authentication system using face authentication, comprising an image capturing device, a display device, and a control unit. The image capturing device is for capturing an image of a user. The display device is for providing a display interface to the user. The control unit includes a facial feature recognition module, an eye-movement analyzing module, a graphic producing module, and a graphic authentication module. The facial feature recognition module is for obtaining the user's image with facial features and comparing the facial features with user authentication information in an authentication database to confirm the user's identity. The eye-movement is for analyzing module for obtaining the user gaze direction and eye movements according to eye features in the user's image. The graphic is for producing module for producing a plurality of dynamic graphics on the display interface. The graphic authentication module is for generating authentication-oriented input information according to the dynamic graphic selected by the user through the gaze direction and comparing the authentication-oriented input information with user authentication information in an authentication database.

Further, the facial features include iris features in an iris region or blood vessel distribution features of a sclera region.

Another object of the present invention is to provide a dynamic graphic eye-movement authentication system using hand authentication comprises an image capturing device, a hand feature capturing device, a display device, and a control unit. The image capturing device is for capturing an image of a user. The display device is for providing a display interface. The control unit includes a hand feature recognition module, an eye-movement analyzing module, a graphic producing module, and a graphic authentication module. The hand feature recognition module is for comparing the hand feature-related information with authentication data of an authentication database to confirm the user's identity. The eye-movement analyzing module for obtaining the user gaze direction and eye movements according to eye features of the user's image. The graphic producing module for producing a plurality of dynamic graphics on the display interface. The graphic authentication module for generating authentication-oriented input information according to the dynamic graphic selected by the user through the gaze direction and comparing the authentication-oriented input information with user authentication information in an authentication database.

Further, the hand feature-related information includes fingerprint feature-related information or palm feature-related information.

Further, the control unit includes a self-volitional confirmation module for providing a graphical interface or hidden interface to the user, to obtain the user's eye movements or gaze direction, wherein the self-volitional confirmation module determine whether the user is self-volitional behavior, according to the user's eye movements or gaze direction.

Further, the dynamic graphic moves along a regular or irregular path provided from the graphic producing module.

Further, the dynamic graphic includes numbers, text, graphics, and a combination thereof.

Further, the control unit includes a graphic authentication setting module for displaying a plurality of objects on the display device, with each said object corresponding to the dynamic graphic, such that the user configures the user authentication information by selecting the plurality of objects and stores the user authentication information into the authentication database.

Further, the control unit includes a timing module for starting to perform timing as soon as the user's gaze direction moves to the dynamic graphic, and confirming entry of a password corresponding to the dynamic graphic being watched at when a watching time exceeds a predetermined value.

Further, the graphic producing module displays a cursor graphic on the display device according to the user gaze direction, and the cursor graphic moves to a dynamic graphic to cause the timing module to start up and generate a timing graphic which shows the user gaze direction stay time.

Further, the graphic producing module stops movement of the dynamic graphic upon detection that the user gaze direction moves to the dynamic graphic.

Another object of the present invention is to provide a dynamic graphic eye-movement authentication method, comprising the steps of: displaying a plurality of dynamic graphics on a display device; providing a path to the dynamic graphic to allow the dynamic graphic to move along the path; providing a cursor graphic on the display device corresponding to a user gaze direction; recording the dynamic graphic selected according to the gaze direction to generate authentication-oriented input information according to the dynamic graphic selected; and comparing the authentication-oriented input information with user authentication information in an authentication database to confirm whether the authentication-oriented input information matches the user authentication information.

Another object of the present invention is to provide a dynamic graphic eye-movement authentication method using face authentication, comprising the steps of: capturing a user's image; capturing facial features from the user's image and comparing the facial features with data of a database to confirm the user's identity; capturing an eye-related image from the user's image and calculating the user gaze direction according to the eye-related image; displaying a plurality of dynamic graphics on a display device and providing a path to the dynamic graphics to allow the dynamic graphics to move in a direction of the path; recording the dynamic graphic selected according to the gaze direction to generate authentication-oriented input information according to the dynamic graphic selected; and comparing the authentication-oriented input information with user authentication information in an authentication database to confirm whether the authentication-oriented input information matches the user authentication information.

Further, the facial features include iris features in an iris region or blood vessel distribution features of a sclera region.

Another object of the present invention is to provide dynamic graphic eye-movement authentication method using hand authentication, comprising the steps of: capturing a hand feature-related information of a user and comparing the hand feature-related information with data of a database to confirm the user's identity; capturing a user's image, capturing an eye-related image from the user's image, and calculating the user gaze direction and eye movements according to the eye-related image; displaying a plurality of dynamic graphics on a display device and providing a path to the dynamic graphics to allow the dynamic graphics to move along the path; recording the dynamic graphic selected according to the gaze direction to generate authentication-oriented input information according to the dynamic graphic selected; and comparing the authentication-oriented input information with user authentication information in an authentication database to confirm whether the authentication-oriented input information matches the user authentication information.

Further, the hand feature-related information comprises fingerprint feature-related information or palm feature-related information.

Further, the step further involves providing a graphical interface or hidden interface for the user to watch at and enter data into and obtaining the user's eye movements or gaze direction so as to confirm, according to the user's eye movements or gaze direction, whether the user is operating self-volitionally.

Further, the dynamic graphic moves according to a regular or irregular path.

Further, the dynamic graphic contains one of numbers, text, graphics, and a combination thereof.

Further, a stay time of the gaze direction is recorded as soon as the user gaze direction moves to the dynamic graphic, a password corresponding to the dynamic graphic being watched at is entered when the stay time exceeds a predetermined value.

Further, when the timing function starts, a timing graphic for stay time is also generated.

Further, upon detection that the user gaze direction moves to the dynamic graphic, movement of the dynamic graphic is stopped.

Compared with the prior art, the present invention has advantages as follows:

1. The present invention discloses that users enter passwords through dynamic graphics to prevent the passwords from being divulged as a result of keylogging performed on the users' eye-movement paths.

2. The present invention discloses that users enter graphic authentication through dynamic graphics to reduce the chance that third parties will guess the graphic authentication right.

BRIEF DESCRIPTION OF THE DRAWINGS

FIG. 9-1 through FIG. 9-5 are schematic views (1) of a graphic authentication menu of the present invention;

FIG. 11-1 through FIG. 11-5 are schematic views (2) of the graphic authentication menu of the present invention;

FIG. 13-1 through FIG. 13-5 are schematic views (3) of the graphic authentication menu of the present invention;

DETAILED DESCRIPTION OF THE EMBODIMENT OF THE INVENTION

The details and technical solution of the present invention are hereunder described with reference to accompanying drawings. For illustrative sake, the accompanying drawings are not drawn to scale. The accompanying drawings and the scale thereof are restrictive of the present invention.

Figure 1:
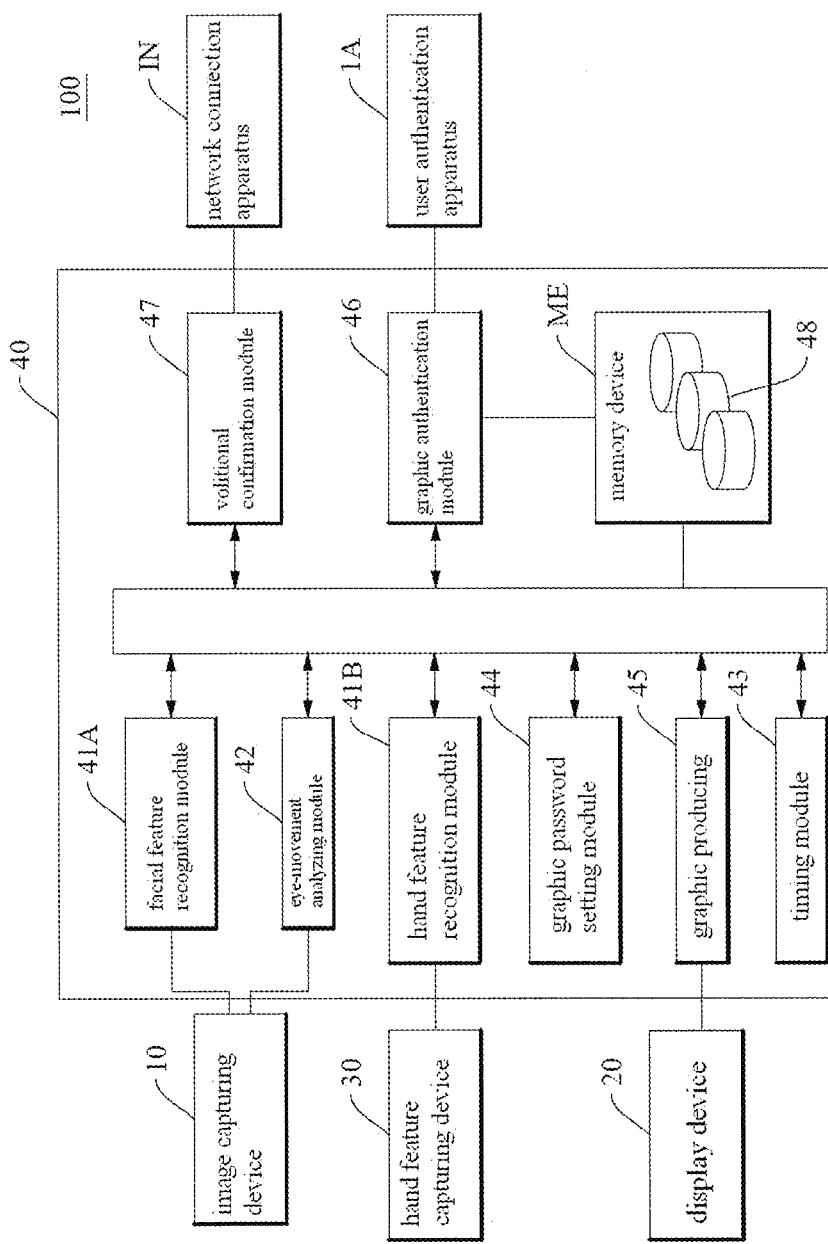
FIG. 1 is a block diagram of an eye-movement authentication system of the present invention.

An eye-movement authentication system of the present invention is illustrated by a specific embodiment below. FIG. 1 is a block diagram of an eye-movement authentication system of the present invention.

Referring to FIG. 1, the present invention provides a dynamic graphic eye-movement authentication system 100 for use with a user authentication apparatus 1A to confirm a user's identity. The user authentication apparatus 1A is exemplified by a safe, an access control system, an ATM device, an online ATM device, or a natural person certificate device, but the present invention is not limited thereto.

The eye-movement authentication system 100 essentially comprises an image capturing device 10, a display device 20, a hand feature capturing device 30, and a control unit 40 connected to the image capturing device 10, display device 20, and hand feature capturing device 30.

The image capturing device 10 captures a user's images to further capture images of the user's facial features and eyes. Specifically speaking, the image capturing device 10 is a camera which comes with charge coupled devices (CCD) or complementary metal-oxide semiconductor (CMOS), but the present invention is not limited thereto. After capturing the user's images, the image capturing device 10 sends the user's images to the control unit 40 for analysis. The display device 20 provides a display interface 21 (shown in FIG. 4) to be watched at by the user. The display interface 21 is a TN panel (Twisted Nematic panel), STN panel (Super-twisted Nematic Display panel), VA panel (Vertical Alignment panel), IPS panel (In-Plane Switching panel), PLS panel (Plane to Line Switching panel), ASV panel (Advanced Super-V panel), FFS panel (Fringe Field Switching panel), OCB (Optical Compensated Birefringence panel), the like, or conventional CRT (Cathode Ray Tube) screen, but the present invention is not limited thereto.

The hand feature capturing device 30 is a fingerprint capturing device or a palm feature capturing device.

Specifically speaking, the fingerprint capturing device is a non-contact optical scanner, a contact silicon-chip scanner, or the like. The optical scanner comprises an array of thousands of charge coupled devices and captures images of the user's fingertips to obtain digital grayscale images of ridges and furrows of the fingertips and effectuate binarization of the digital grayscale images, thereby obtaining fingerprint features. The silicon-chip scanner sets the predetermined capacitance level of thousands of capacitors on the array by induction. The ridges and furrows of the fingertips take the small amount of charges on the scanner array and thus change the potential levels of the capacitors on the array, and in consequence fingerprint features of a fingertip in contact with the scanner can be read from the changed potential levels. The fingerprint features are patterns of ridges and furrows of the fingertip. The obtained fingerprint features are sent to a hand feature recognition module 41B of the control unit 40 and then compared with data stored in a database 48 of the control unit 40. In addition to the above techniques, the user's fingerprint features can be captured by means of temperature difference, pressure difference, infrared, or the like, but the present invention is not limited to the aforesaid two embodiments.

Specifically speaking, the palm feature capturing device is a scanner, camera, palm image capturing device, infrared camera, or the like. The scanner comprises a xenon lamp or a luminescent lamp which serves as a light source. The scanner further comprises CCDs for performing a linear scan unidirectionally, to and fro, so as to obtain the user's palmar images, wherein redundant information, such as information pertaining to palmar creases, is removed by adjusting the scanner's parameters. The camera is, for example, a CCD camera or a CMOS camera, which enhances the sharpness of a palm print and reduces noise through an appropriate filter and an appropriate light ray. The palm image capturing device is specially designed to obtain a palm image and disposed above a CCD camera or a CMOS camera. The palm image capturing device comprises a fixed lighting module which not only emits a light ray from a fixed angle but also provides a space corresponding in shape and size to the user's palm such that the center of the user's palm is suspended in the air. The palm image capturing device further comprises a casing which blocks ambient light so as to obtain perfect palmar imaged. The infrared camera works by infrared lighting and takes pictures of the veins of the user's palm, wherein oxygen-carrying hemoglobins undergo an infrared scan. Degenerated hemoglobins absorb infrared; hence, in the pictures taken of the user's palm by the infrared camera, the veins are black in color, whereas the rest of the palm is white in color.

In a variant embodiment of the present invention, the hand feature capturing device 30 can be replaced with the image capturing device 10 such that the user moves the finger or palm into the image-capturing region of the image capturing device 10, so as for the user's hand information to be obtained. To this end, it is also feasible that the hand feature capturing device 30 is integrated into the image capturing device 10 in another variant embodiment of the present invention.

The control unit 40 is coupled to a memory device ME which stores a program or data such that related steps can be executed by accessing the program or data stored in the memory device ME. The control unit 40 is a central processing unit (CPU) or any programmed, general/dedicated device, such as a microprocessor, a digital signal processor (DSP), a programmed controller, an application specific integrated circuit (ASIC), a programmable logic device (PLD), and a combination thereof. The memory device is a fixed or movable random access memory (RAM), read-only memory (ROM), flash memory, equivalent memory, or a combination thereof. In a variant embodiment of the present invention, the memory device comprises one or more non-volative memory components. Specifically speaking, the memory device is a hard disk drive, memory card, integrated circuit, or firmware. In another preferred embodiment, the control unit 40 and the memory device ME together form a processor, wherein programs prestored in the memory device ME are loaded onto the control unit 40 to execute related algorithms, respectively.

Two different embodiments for the user authentication apparatus 1A are described below.

Figure 2:
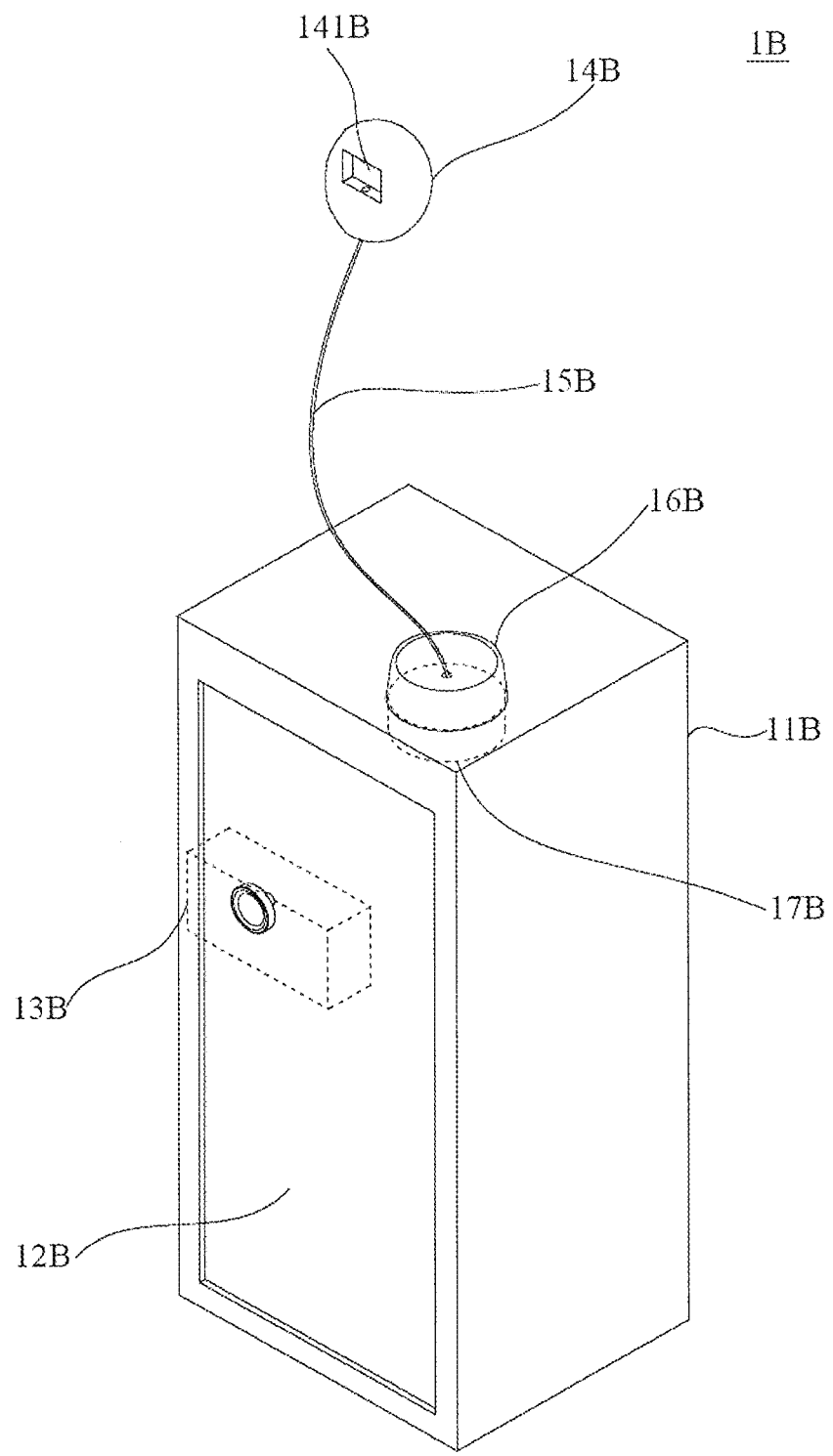
FIG. 2 is a schematic view of the first embodiment of the present invention.

In a preferred embodiment, the user authentication apparatus 1A is a safe 1B. Referring to FIG. 2, the safe 1B comprises a casing 11B, a protective door 12B, a door-locking module 13B, and an ocular device 14B. The casing 11B has therein a receiving space for containing an object. The protective door 12B is movably disposed on one side of the casing 11B to conceal the receiving space; hence, the receiving space is insulated from the outside and thus hermetically sealed. The door-locking module 13B controls the opening and shutting of the protective door 12B. The ocular device 14B and the casing 11B are connected by a transmission line 15B. A storage box 16B is disposed on the casing 11B. A winder 17B is disposed below the storage box 16B. When the safe 1B is not in use, the user can wind the transmission line 15B on the winder 17B and then store it below the storage box 16B.

The ocular device 14B has therein the display device 20 and the image capturing device 10. To operate the ocular device 14B, the user puts a window 141B of the ocular device 14B near the user's eyes and then moves the cursor on the display device 20 according to the gaze direction so as to enter a password and unlock or lock the door-locking module 13B according to the result of password comparison.

Figure 3:
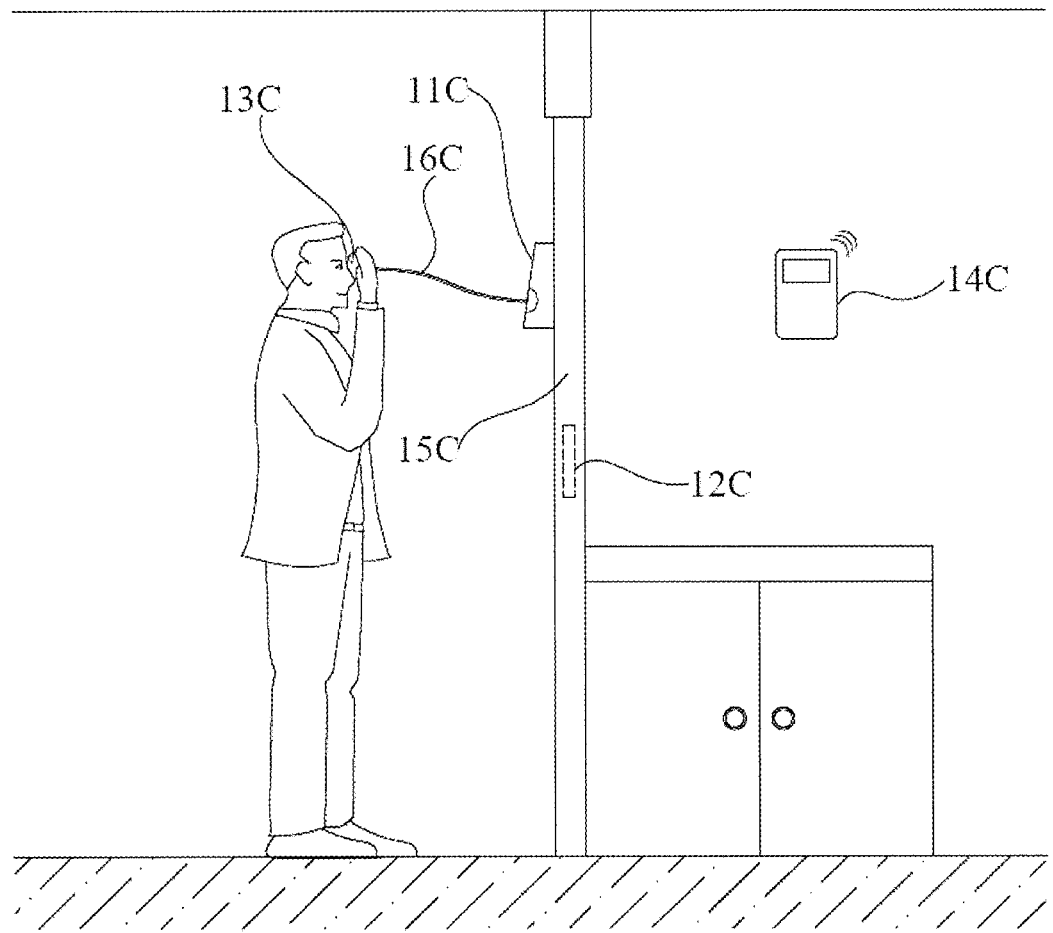
FIG. 3 is a schematic view of the second embodiment of the present invention.

In another preferred embodiment, the user authentication apparatus 1A is an access control system 1C shown in FIG. 3. The access control system 1C comprises a wall-mounted host 11C, a door-locking module 12C, and an ocular device 13C. A security host 14C is disposed indoors. The wall-mounted host 11C is disposed on one side of a door 15C or is directly disposed on the door 15C. The door-locking module 12C controls the opening and shutting of the door 15C. The ocular device 13C and the wall-mounted host 11C are connected by a transmission line 16C. A positioning slot is disposed on the wall-mounted host 11C. A winder is disposed on the inner side of the wall-mounted host 11C. When the access control system 1C is not in use, the user can wind the transmission line 16C on the winder and then store it in the wall-mounted host 11C such that the ocular device 13C is stored in the positioning slot for holding the ocular device 13C.

The ocular device 13C has therein the display device 20 and the image capturing device 10. To operate the ocular device 13C, the user puts a window of the ocular device 13C near the user's eyes and then moves the cursor on the display device 20 according to the gaze direction so as to enter a password.

Functional characteristics of the present invention are hereunder described with reference to FIG. 1.

The control unit 40 comprises a facial feature recognition module 41A, hand feature recognition module 41B, eye-movement analyzing module 42, timing module 43, graphic password setting module 44, graphic producing module 45, graphic authentication module 46, self-volitional confirmation module 47, and database 48.

The facial feature recognition module 41A is for obtaining the user's image, capturing facial features from the user's image, and comparing the facial features with data of the database 48 to confirm the user's identity. To achieve a precise recognition rate, in this preferred embodiment, the facial features are the user's iris features, face features, sclera features, or a combination thereof (for example, performing iris feature comparison first, and then performing face features comparison and sclera feature comparison.) Upon completion of the comparison, the facial feature recognition module 41A finds, by a user index, the user data and authority corresponding to the facial features, and generates a control signal according to the user's authority, or further executes the password entering process, or further confirms the user's self-volition, so as to give protection to the user's data twice.

The embodiments of iris feature authentication, face features feature authentication, and sclera feature authentication are described below, respectively.

Iris Feature Authentication:

In a preferred embodiment, the facial feature recognition module 41A captures the user's eye-related image from the user's image to obtain iris features from the iris region in the eye-related image. The face recognition process entails comparing the captured iris features with iris data stored in the database 48, so as to confirm the user's identity.

The iris comparison method is briefly described below. Since the iris manifests a high reflection rate at the near infrared frequency band, the user's eye is irradiated with near infrared with a view to capturing an iris-related image in order to obtain iris features easily. Afterward, the facial feature recognition module 41A defines an eye region in the user's face-related image and performs binarization on the eye region to obtain a border between iris and sclera as well as a border between iris and pupil so that the region between the two borders is defined as the iris region. To preclude any effect imposed on the iris by variations arising from the dilation and contraction of the pupil, the obtain iris features undergo normalization and then comparison. Afterward, iris features are extracted from the normalized iris-related image by a filter to represent iris data. The extracted data is binary iris codes. Finally, the extracted iris codes are compared with iris codes of the database 48 one by one to find the closest iris code, so as to confirm the user's authority.

Face Feature Authentication:

In addition to the embodiment of executing user authentication by iris features, another preferred embodiment is characterized in that the facial features are face profile, relative positions of facial features, and facial protuberances shown in the user's face-related image. The facial feature recognition module 41A captures the user's face-related image and compares it with data of the database 48, so as to confirm the user's identity.

Specifically speaking, the facial features are analyzed with algorithms by related techniques, including Principal Component Analysis (PCA), Linear Discriminant Analysis (LDA), Orthogonal Local Preserving Projection (OLPP), Discrete Wavelet Transform, Support Vector Machine, and K-nearest Neighbors, such that facial features, including face profile, relative positions of facial features, and facial protuberances, can be compared with data of the database 48, so as to determine the user's authority.

Related techniques of facial feature recognition are disclosed in the prior art and thus are not reiterate herein for the sake of brevity.

Sclera Feature Authentication

In another preferred embodiment, the facial features are blood vessel distribution features of a sclera region in the user's eye-related image. In principle, the sclera recognition method is similar to the iris recognition method, as both of them involve capturing interested regions by binarization. The main difference between sclera recognition and iris recognition lies in the captured region. The images captured in iris recognition are focused on the iris texture of the human eye, whereas the images captured in sclera recognition are focused on blood vessel distribution of the sclera of the human eye.

The method of sclera comparison is briefly described below. First, the facial feature recognition module 41A defines an eye region in the user's face-related image and performs binarization (or color separation) on the eye region to obtain a border between eyelid and sclera as well as a border between sclera and corner so that the region between the two borders is defined as the sclera region. The captured sclera region undergoes normalization to obtain sclera features for facilitating subsequent comparison. Blood vessel distribution features are extracted from the normalized sclera features by a filter to represent sclera data. The extracted data is binary sclera codes. Finally, the extracted sclera codes are compared with sclera codes of the database 48 one by one to find the closest sclera code, so as to confirm the user's authority.

In addition to authenticating the user's identity by the facial feature recognition module 41A according to the user's facial features, the present invention proposes performing user authentication by the hand feature recognition module 41B according to the user's hand features.

The hand feature recognition module 41B obtains the user's hand feature-related information from the hand feature capturing device 30 and compares the hand feature-related information with data of the database 48 to confirm the user's identity. Upon completion of the comparison, the hand feature recognition module 41B finds, by a user index, the user's data and authority corresponding to the hand features and generates a control signal according to the user's authority, or further executes the password entering process, or further confirms the user's self-volition, so as to give protection to the user's data twice.

The hand feature recognition module 41B is a fingerprint feature recognition module or palm feature recognition module. The embodiments of the fingerprint feature authentication and the palm feature authentication are described below, respectively.

Fingerprint Feature Authentication:

The fingerprint feature recognition module obtains the user's fingerprint features (hand feature-related information) from the hand feature capturing device 30 and then compares the fingerprint features with data of the database 48 to confirm the user's identity. In a preferred embodiment, the fingerprint feature recognition module converts the fingerprint structure features (core and delta) or fingerprint detail features (bifurcation and endpoint) into feature codes, and then stores the feature codes in the database 48 to serve as recognition references. To perform the comparison, with the feature codes captured from the user's fingerprint structure features or fingerprint detail features, the user index is searched for conforming user data, to confirm the user's identity and authority. However, the aforesaid technique is merely an exemplary preferred embodiment, as the present invention is not limited to the embodiment.

Palm Feature Authentication:

The palm feature recognition module obtains the user's palm features (hand feature-related information) from the hand feature capturing device 30 and then compares the palm features with data of the database 48 to confirm the user's identity. In a preferred embodiment, the palm features are geometric features, such as the length and width of the phalanges of the hand, as well as the area, length and thickness of the palm, or a palm print extracted from a palm image, or palmar blood vessel distribution. The palm feature recognition module obtains palm features by marginalization, palm print extraction, interested region segmentation, or binarization, converts the palm features into feature codes, and stores the feature codes in the database 48 to serve as recognition references. To perform the comparison, with the feature codes captured from the user's palm features, the user index is searched for conforming user data, to confirm the user's identity and authority. However, the aforesaid technique is merely an exemplary preferred embodiment, as the present invention is not limited to the embodiment.

The facial feature recognition module 41A and the hand feature recognition module 41B are separately implemented in different embodiments or in the same embodiment to perform dual authentication on facial features and hand features, but the present invention is not limited thereto.

The eye-movement analyzing module 42 calculates the user gaze direction and eye movements according to eye features of the user's image. Regarding the gaze direction, the eye-movement analyzing module 42 generates eye movement-related information by analyzing the geometric relation between the pupil center and light spots. The positions of the user's pupil center and light spots shown in the captured eye-related image are obtained by binarization. The eye-movement analyzing module 42 defines a standard line according to the pupil center, generates connection lines between the pupil center and the light spots, measures the included angles between the standard line and the connection lines, and determines the geometric relation between the pupil center and the light spots according to the included angles, thereby determining the gaze direction. The process flow involves creating a plurality of samples of the human eye movements by a trainer and then determining the user gaze direction by interpolation, so as to confirm the user gaze direction.

Regarding the eye movements, the user's eye movements are calculated with a simple algorithm, for example, to determine the commands entered by the user, according to the directions of the movements of the eyeballs and the paths of the movements of the eyeballs. In a preferred embodiment, the eye movements are obtained by a simple algorithm, for example, to divide the sclera between the two eyelids into a plurality of blocks and then generate a control signal according to the ratio of the blocks.

Related techniques of detecting eye movements are disclosed in the prior art and thus are not reiterate herein for the sake of brevity.

The self-volitional confirmation module 47 provides a graphical interface or hidden interface for the user to watch at and enter data into. The graphical interface or hidden interface corresponds in position to the eye-movement analyzing module 42, allowing the user's eye movements or gaze direction to be obtained. The self-volitional confirmation module 47 determines, according to the user's eye movements or gaze direction, whether the user is operating self-volitionally.

Figure 4:
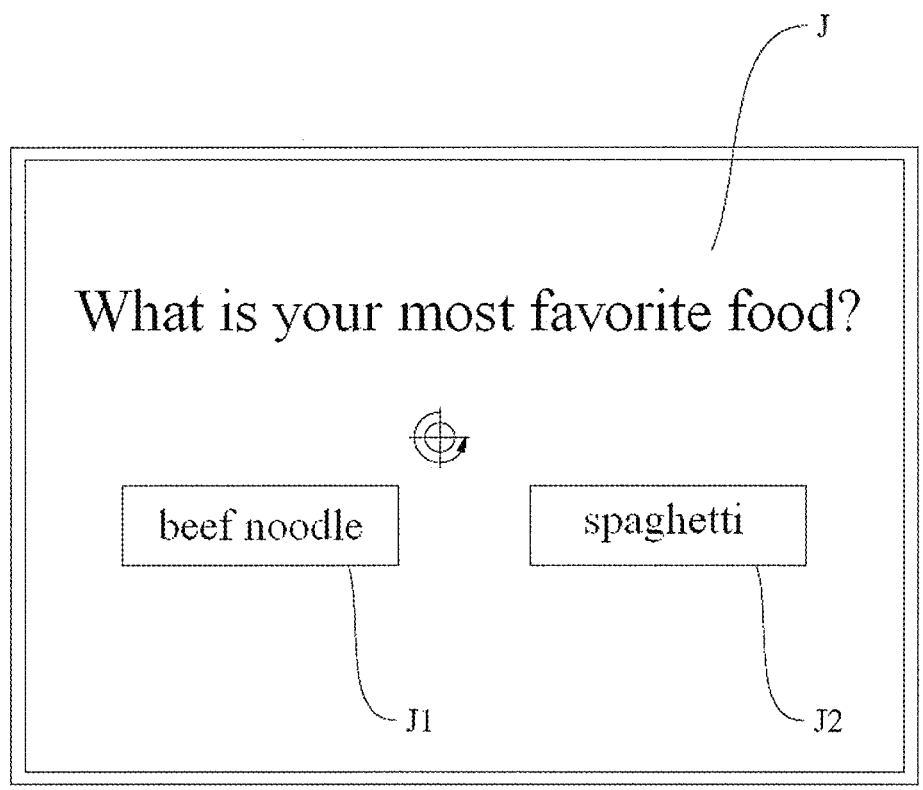
FIG. 4 is a schematic view of a self-volitional confirmation module according to a preferred embodiment of the present invention.

Referring to FIG. 4, in a preferred embodiment, the self-volitional confirmation module 47 provides a graphical interface J for use by the user. The graphical interface J provides a smart enquiry-response function. Depending on the identity information previously entered by the user, the smart enquiry-response function generates related enquiry-response content. With reference to the resultant enquiry-response content, it is feasible to determine whether the user is operating the device self-volitionally. In response to the user's identity, the self-volitional module 47 poses a question for the user to answer. In this embodiment, the question is: what is your most favorite food? The graphical interface J displays option buttons J1, J2. The option button J1 shows an icon of beef noodle. The option button J2 shows an icon of spaghetti. If the user initially set his or her favorite food to beef noodle in an initial configuration process and now selects the option button J2 (spaghetti), the self-volitional confirmation module 47 will determine that the user is operating the menu but not self-volitionally, and thus will generate a related control signal. In a preferred embodiment, the control signal is, for example, sent to a security apparatus to execute a locking function and preclude any access. In another preferred embodiment, the control signal is sent to a background center through a network connection apparatus IN to thereby give an alert to the background center.

Figure 5:
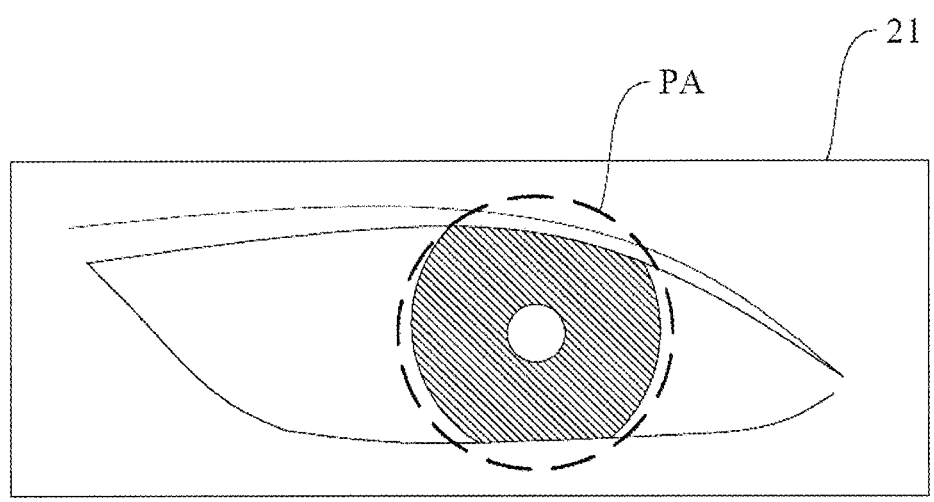
FIG. 5 is a schematic view of an iris authentication menu according to a preferred embodiment of the present invention.
Figures 1, 11:
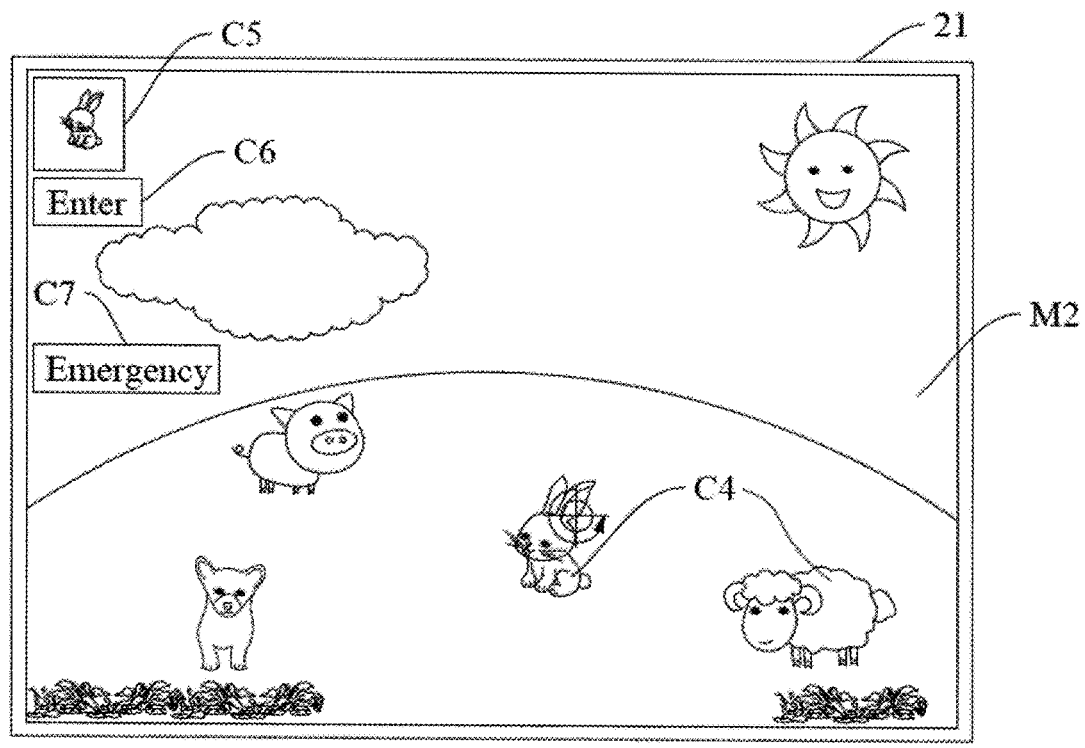
Figures 2, 11:
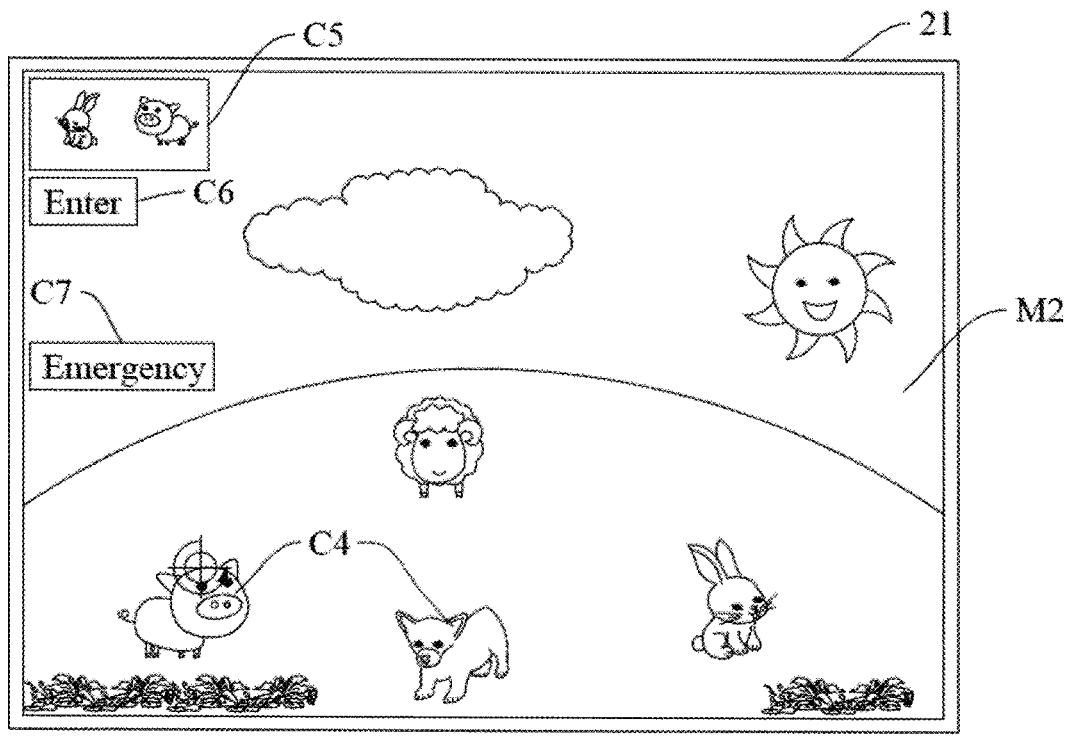
Figures 3, 11:
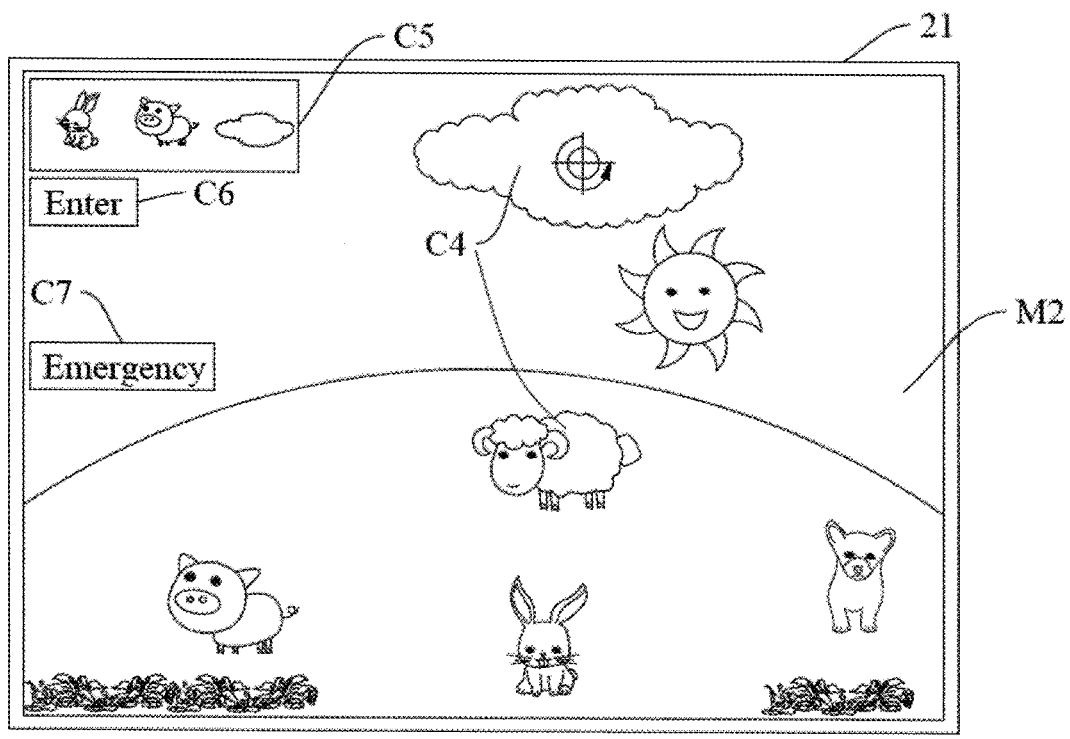
Figures 4, 11:
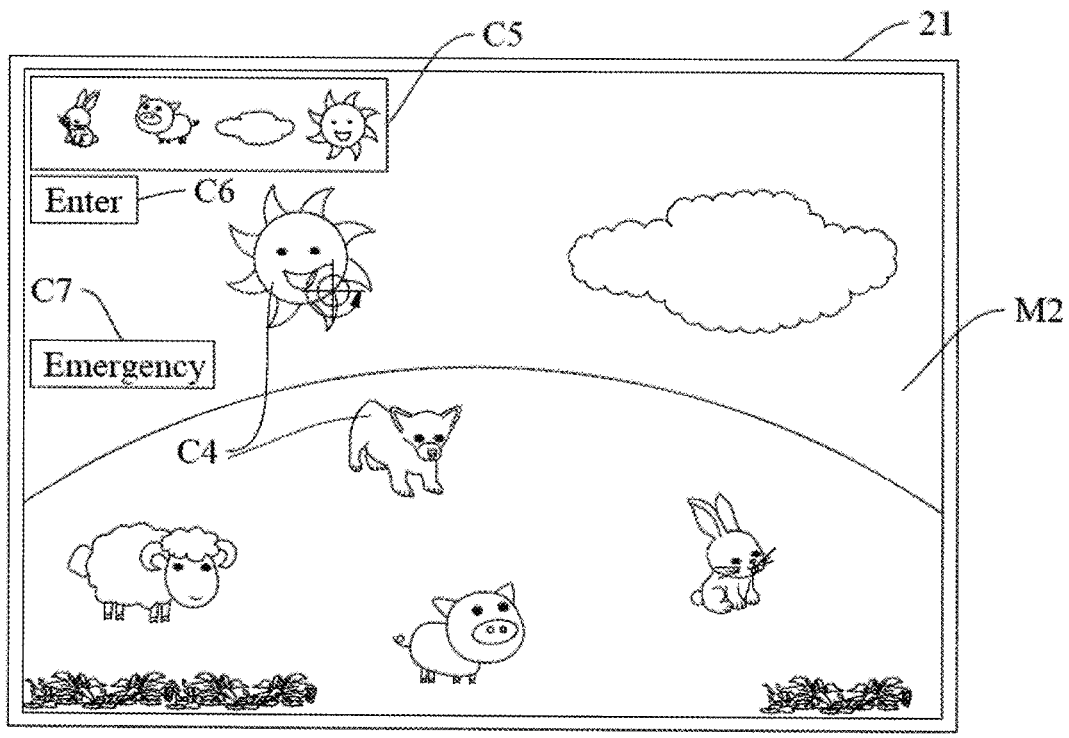
Figures 5, 11:
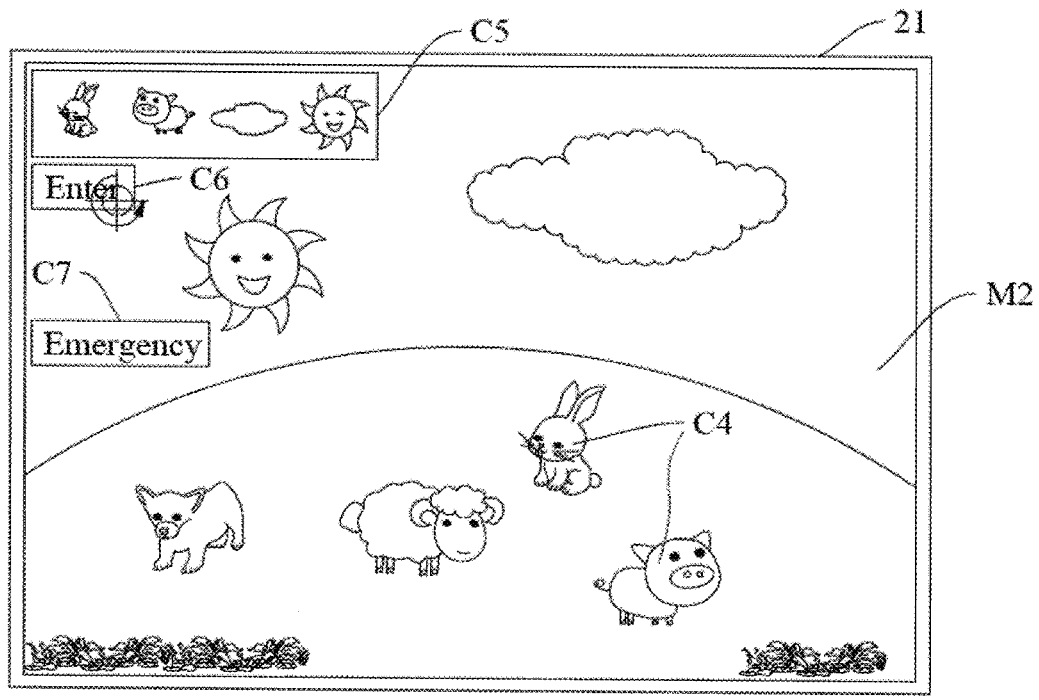
Figure 12:
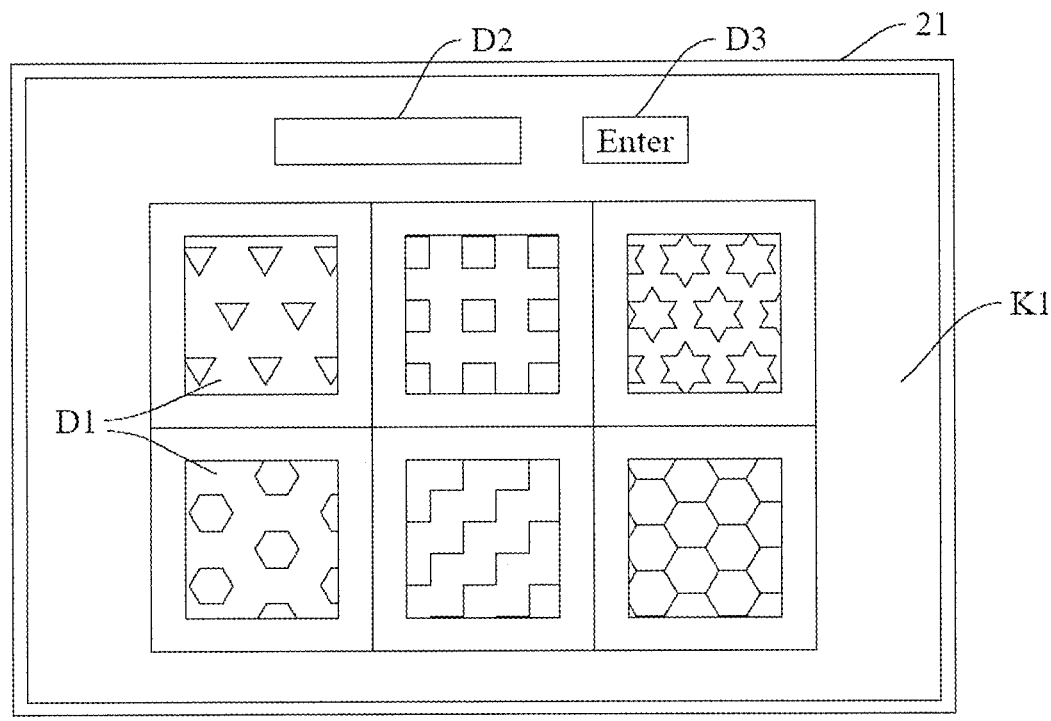
FIG. 12 is a schematic view (3) of the password setting menu of the present invention.

In another preferred embodiment, the graphical interface provided by the self-volitional confirmation module 47 contains graphics to be watched at and selected by the user such that the user can request rescue secretly while performing non-volitional menu operation. Referring to FIG. 11-1 through FIG. 11-5, an emergency button C7 is shown on the left of graphic authentication menu M2. If the user is operating the device under duress, the user's eye-movement can be directed to the emergency button C7 by following the gaze direction, to send an alert signal to a background center or cloud-based rescue center.

In another preferred embodiment, the self-volitional confirmation module 47 provides, for example, a hidden interface which can be executed behind the scene and triggered by the user's eye movements. When under duress, the user can enter related eye movements (for example, regular or irregular eye rotational movements according to the gaze direction) into the menu. When the self-volitional confirmation module 47 detects that the user is performing predefined eye movements, the self-volitional confirmation module 47 generates a related control signal. In a preferred embodiment, the user uses eye movements to decide a rescue command to be sent or decide who to request rescue. For instance, the user calls the police or contacts a cloud-based accident-reporting system or a background service system, by a specific eye movement. In case of a fire, the user will call a fire department or contact a background system, by another specific eye movement, to request accident-reporting support. Alternatively, the user sends the request to a background center or a cloud-based rescue system to give an alert.

When the user gaze direction is moved to a dynamic graphic, the timing module 43 starts a timing function and will confirm the entered password corresponding to the dynamic graphic being watched at when a watching time exceeds a predetermined value.

The graphic password setting module 44 displays a plurality of objects on the display device 20. The objects correspond to the dynamic graphics, respectively. The user configures the user authentication information by selecting the objects and stores user authentication information in the database 48 of the memory device ME. Depending on the configuration of the user or system manufacturer, the graphic password setting module 44 preconfigures a plurality of objects to be selected by the user. The objects correspond to the dynamic graphics, respectively. The user sort user authentication information according to the sequence of the objects entered. The dynamic graphic corresponding to the selected object is displayed on the display device 20, so as to be watched at and selected by the user. The dynamic graphic (or objects) are numbers, text, or graphics which can be easily recognized by the user (depending on the user's mentality). The dynamic graphics correlate with the objects and moves in the graphic authentication menu along the paths given by the graphic producing module 45.

In a preferred embodiment, the user selects, by his or her preference, a dynamic graphic shown in the graphic authentication menu. In another preferred embodiment, the system manufacturer configures at random a plurality of dynamic graphics in the graphic authentication menu to augment the difficult in password cracking.

The graphic producing module 45 produces a plurality of dynamic graphics to be displayed on the display device 20 and watched at by the user. The dynamic graphics were configured by the user or system manufacturer in an initial configuration process. The user authentication information is generated according to the dynamic graphics. In a preferred embodiment, the system manufacturer preconfigures different situational modes in the memory device ME. The situational modes each comprise related objects and dynamic graphics for the user to select. The user authentication information is, for example, presented in the form of a password string which consists of pictures or text. The graphic producing module 45 displays on the graphic authentication menu the dynamic graphics corresponding to the objects selected by the user, and the dynamic graphics thus displayed move along regular or irregular paths, so as to be selected by the user. Specific embodiments of the dynamic graphics are described in detail later.

In a preferred embodiment, the graphic producing module 45 displays a cursor graphic on the display device 2 according to the user gaze direction. The cursor graphic moves to a dynamic graphic to cause the timing module 43 to star up and generate a timing graphic which shows the user gaze direction stay time.

The graphic authentication module 46 records the dynamic graphic selected by the user according to the gaze direction to generate authentication-oriented input information according to the dynamic graphic selected and compares the authentication-oriented input information with user authentication information stored in the database 48. In a preferred embodiment, when the user is watched at the dynamic graphics, the passwords corresponding to the dynamic graphics are stacked sequentially so as to be recorded in the memory device ME to thereby form a password string. In another preferred embodiment, passwords of the password string are arranged in accordance with the sequence of authentication-oriented input information by the graphic authentication module 46 for the sake of comparison, but the present invention is not limited thereto. The graphic authentication module 46 compares passwords of the obtained authentication-oriented input information with passwords of the pre-stored user authentication information. When the confirmation is affirmative, the graphic authentication module 46 sends a control signal to the user authentication apparatus 1A.

When the user starts the eye-movement authentication system 100, the graphic producing module 45 displays facial feature authentication menus (iris authentication menu, facial feature authentication menu, sclera authentication menu) on the display interface 21. The iris authentication menu, face feature authentication menu, and sclera authentication menu are illustrated by specific embodiments and described below, respectively, with reference to FIG. 5, FIG. 6, and FIG. 7. A preferred embodiment for the facial feature authentication menus of the present invention is described below with reference to FIG. 5.

In this embodiment, the user's iris features are captured for comparison. The iris authentication menu displays an iris aligning graphic PA. To undergo user authentication, the user puts his or her eye near the image capturing device 10 to allow the image capturing device 10 to capture the user's eye-related image. Then, the captured eye-related image is displayed on the iris authentication menu. While the eye-related image capturing process is underway, the eye-movement authentication system 100 starts a near infrared-emitting device (not shown) for illuminating the user's eye. The user moves in front of the image capturing device 10 according to the position of the iris aligning graphic PA relative to the user's eye-related image to align the iris region in the user's eye-related image with the center of the iris aligning graphic PA and thus assist the facial feature recognition module 41A in capturing the user's iris-related image and eventually compare it with data of the database 48 to finalize user authentication.

Figure 6:
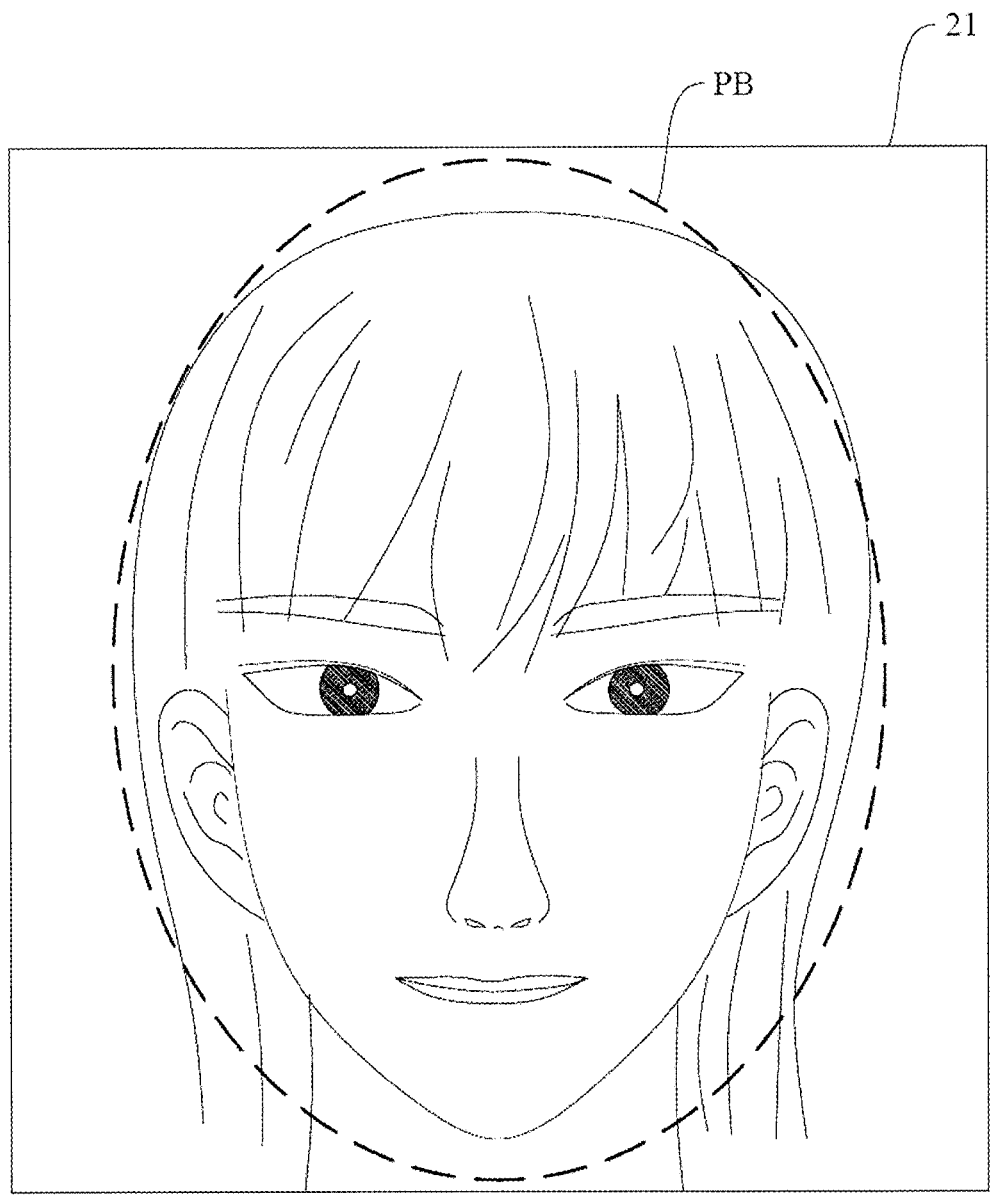
FIG. 6 is a schematic view of a facial feature authentication menu according to a preferred embodiment of the present invention.

An embodiment of the facial feature authentication menu is described below with reference to FIG. 6.

In this embodiment, the user's facial features are captured for comparison. To perform facial feature recognition, the graphic producing module 36 displays a face aligning graphic PB on the facial feature authentication menu. The face aligning graphic PB is elliptic and is displayed centrally in the facial feature authentication menu. The image capturing device 10 captures a face-related image of the user. The captured face-related image is displayed on the facial feature authentication menu. The user moves in front of the image capturing device 10 according to the position of the face aligning graphic PB relative to the user's face-related image to confirm that the range of the profile of the user can be fully moved to the middle of the face aligning graphic PB and thus assist the facial feature recognition module 41A in effectuating recognition according to the user's facial features-related image, and compare it with data of the database 48, thereby finalizing user authentication.

Figure 7:
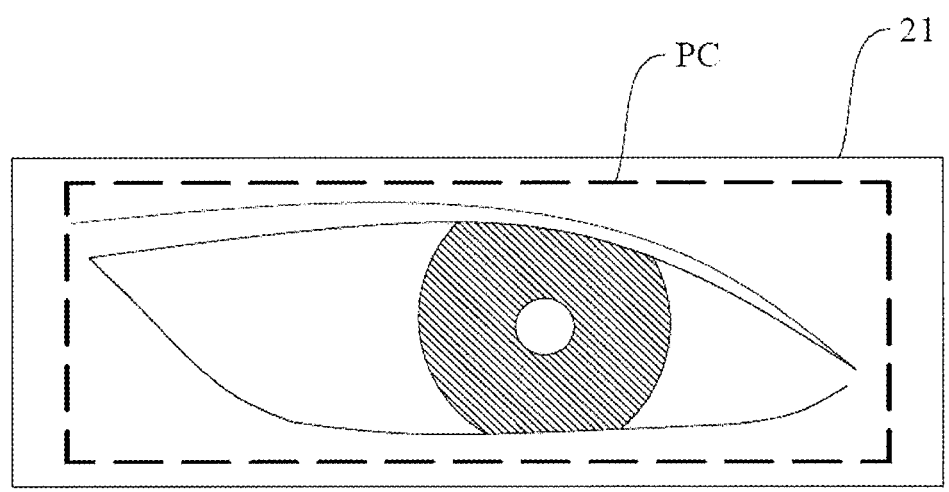
FIG. 7 is a schematic view of a sclera authentication menu according to a preferred embodiment of the present invention.
Figure 8:
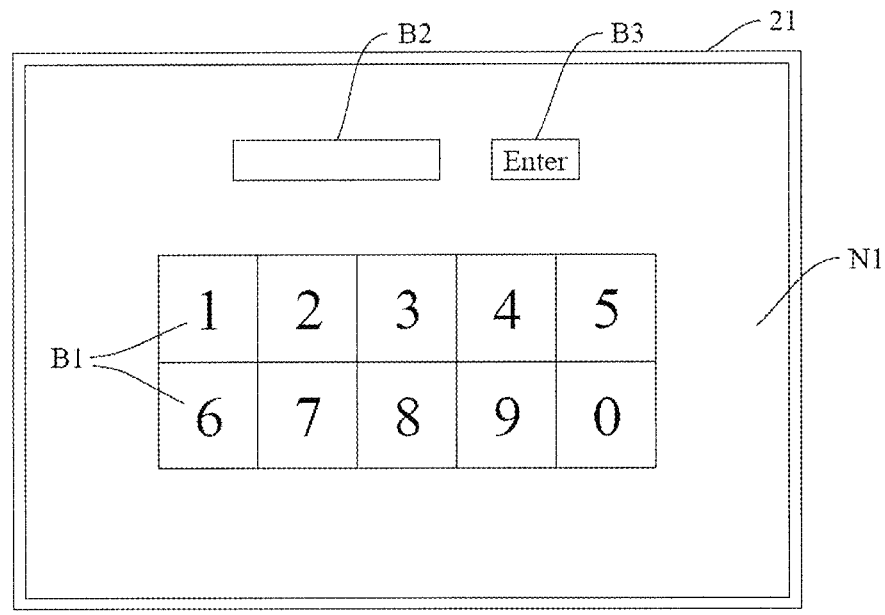
FIG. 8 is a schematic view (1) of a password setting menu of the present invention.

An embodiment of sclera feature comparison is described below with reference to FIG. 7.

In this embodiment, the user's sclera features are captured for comparison. The sclera authentication menu displays a sclera aligning graphic PC. The sclera aligning graphic PC is rectangular and is disposed centrally in the sclera authentication menu. To perform user authentication, the user puts his or her eye near the image capturing device 10 to allow the image capturing device 10 to capture the user's eye-related image. The captured eye-related image is displayed in the sclera authentication menu. The user moves in front of the image capturing device 10 according to the position of the sclera aligning graphic PC relative to the user's eye-related image to move the whole eye region in the user's eye-related image to the middle of the sclera aligning graphic PC and thus assist the facial feature recognition module 41A in capturing the user's sclera-related image, and compare it with data of the database 48, thereby finalizing user authentication.

In another preferred embodiment, the facial feature recognition module 41A directly captures the eye region from the face-related image to obtain a sclera-related image and then compares the sclera-related image to finalize user authentication.

Embodiments of the graphic password setting menu and the graphic authentication menu are described below with reference to FIG. 8, and FIG. 9-1 through FIG. 9-5, respectively.

Initially, the graphic password setting module 44 provides a graphic password setting menu N1 (shown in FIG. 8) to be displayed on the display interface 21 for the user to select an intended password. The graphic password setting menu N1 comprises a plurality of objects B1. In this embodiment, the objects B1 are Arabic numerals 0-9. The user watches at the objects B1 in order to enter a password. The password thus entered is displayed in a password field B2 at the top of the graphic password setting menu N1. After all the passwords have been entered, the user moves the gaze direction to an enter button B3 beside the password field B2 and stores the passwords as user authentication information, thereby finalizing the password setting process.

Upon completion of the password setting process, the passwords are set, by the graphic password setting module 44, to be the user authentication information and stored in the database 48 of the memory device ME. When the user authentication apparatus 1A starts in a subsequent operating session, the graphic authentication menu N2 is displayed to prompt the user to enter a related password.

Figures 1, 9:
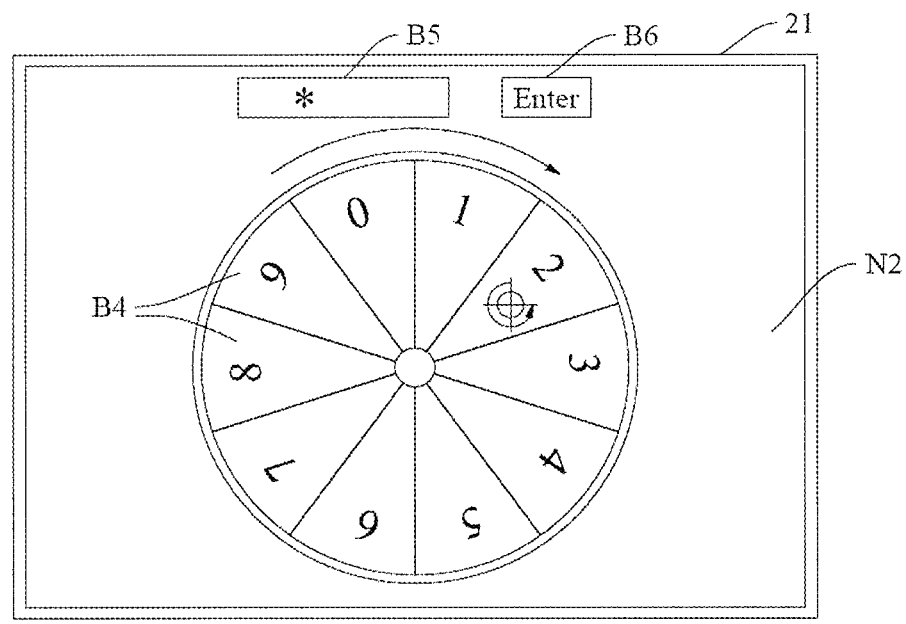
Figures 2, 9:
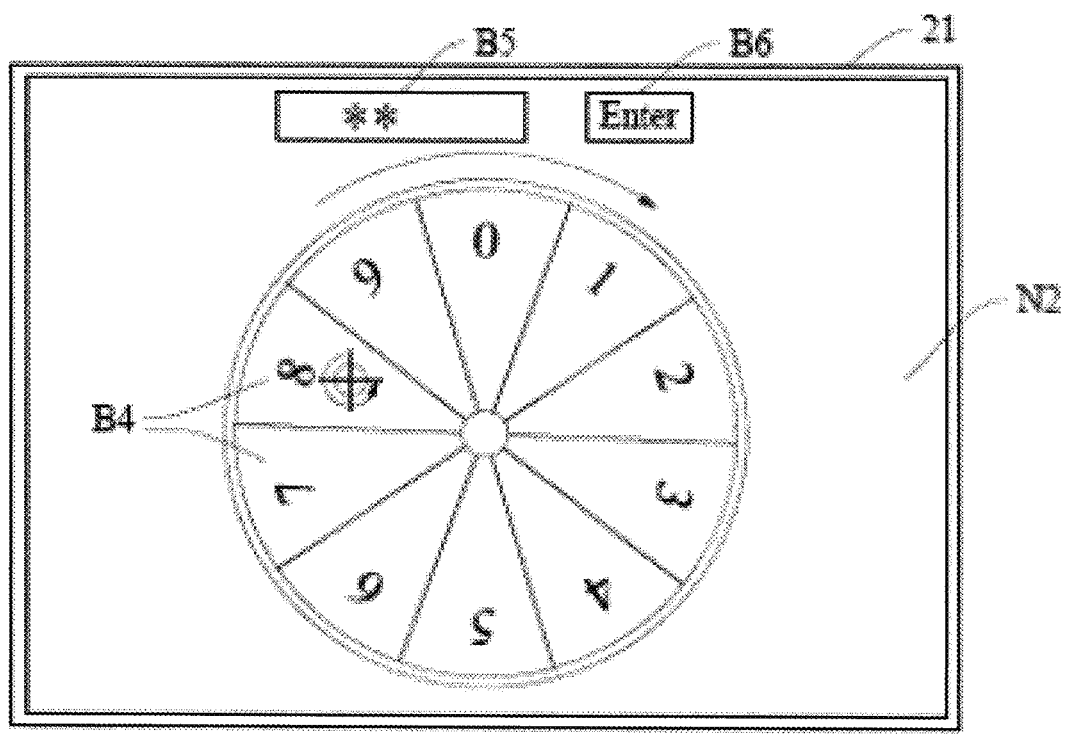
Figures 3, 9:
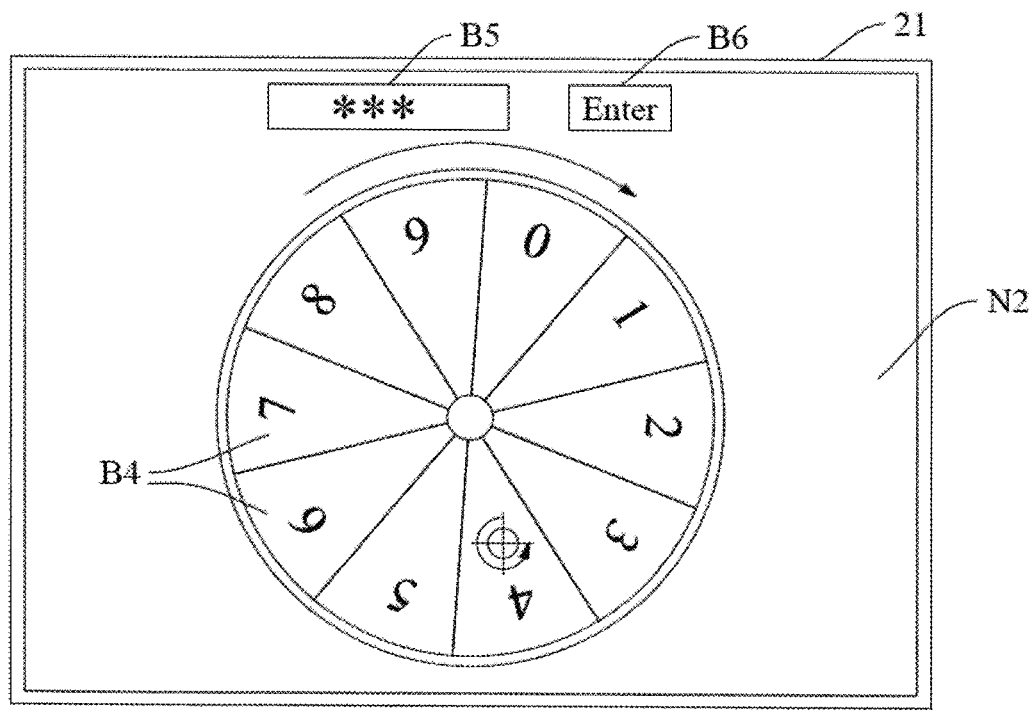
Figures 4, 9:
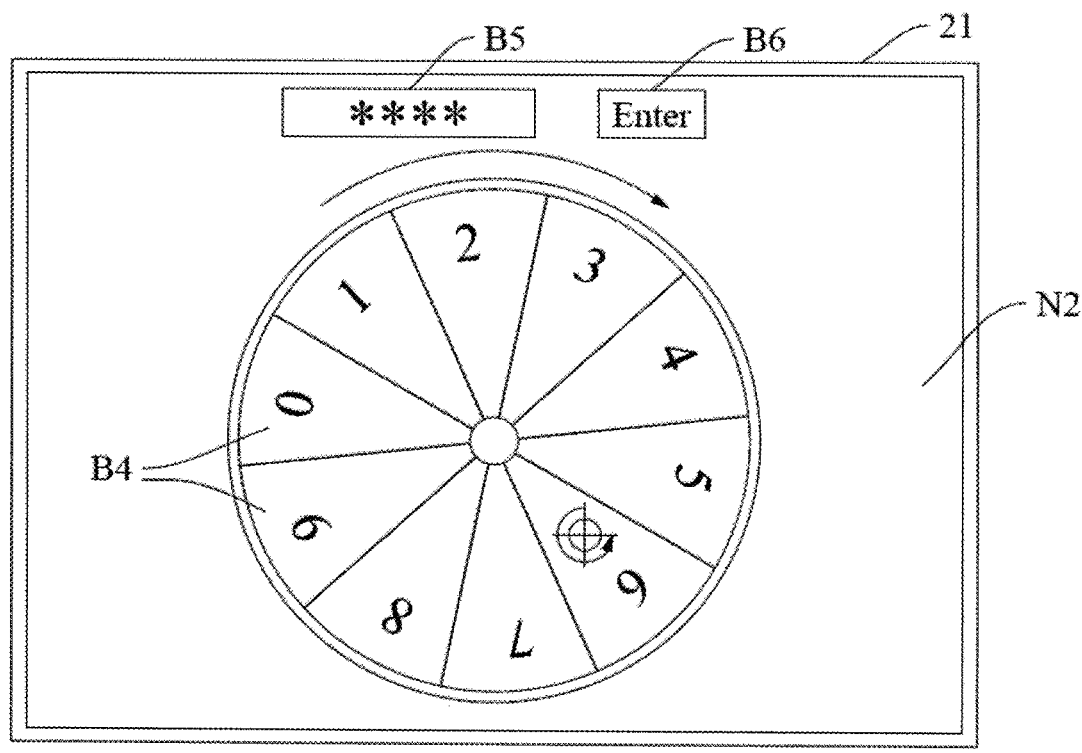
Figures 5, 9:
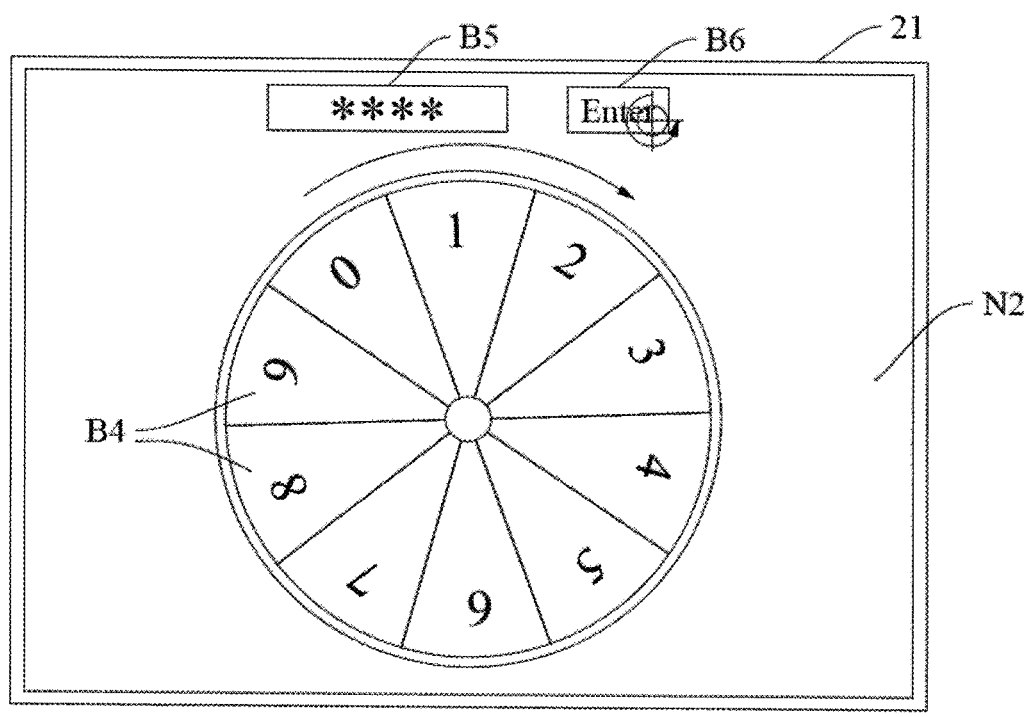
Figure 10:
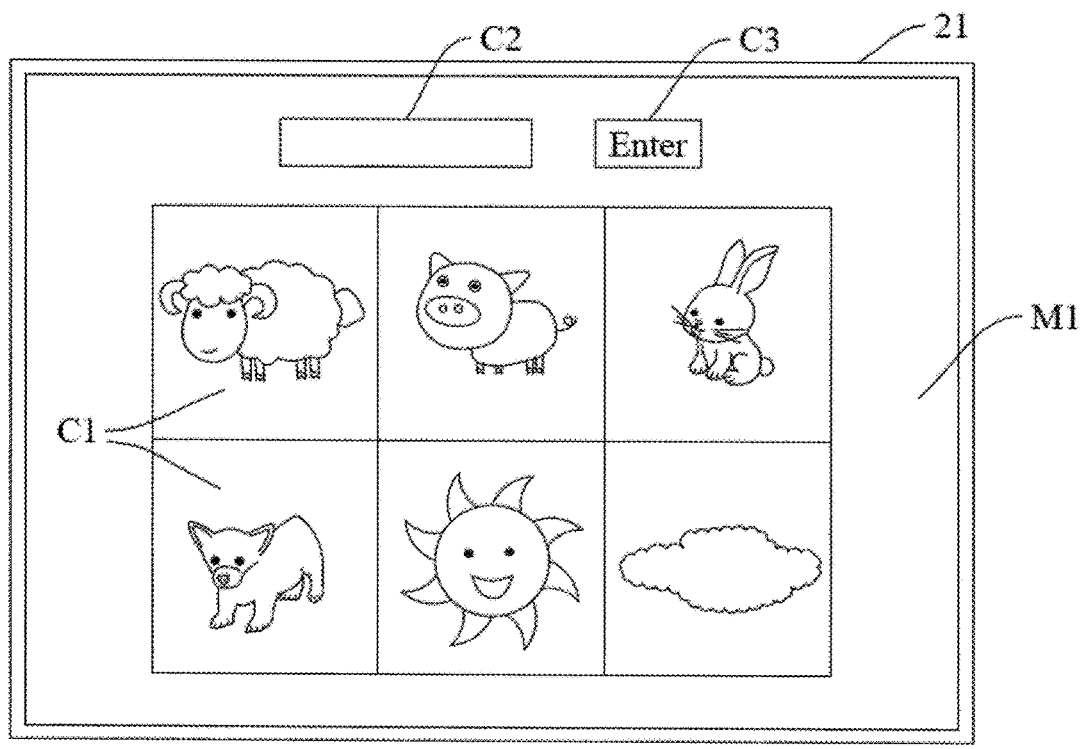
FIG. 10 is a schematic view (2) of the password setting menu of the present invention.

The graphic authentication menu N2, as shown in FIG. 9-1 through FIG. 9-5, displays a wheel-like dynamic graphic B4. The dynamic graphic B4 rotates along a preconfigured path to allow a plurality of numbers shown on the dynamic graphic B4 to rotate continuously in a regular direction, thereby producing a visually dynamic effect.

The plurality of numbers divides the wheel (dynamic graphic B4) into a plurality of blocks by sectoring the wheel. To enter a password, the user must ensure that his or her gaze direction moves together with the related numbers, while the timing module 32 is counting the stay time of the gaze direction. When the user's stay time exceeds a predetermined value, the user enters a related password into the password field B5. For example, to enter a password string "2846," the user moves his or her sight to the number 2 as shown in FIG. 9-1 until the password is confirmed. Then, the user enters the password into the password field B5 such that the password field B5 displays a * graphic for the user to confirm that the first password number has been entered. After the first password number has been entered, the user moves his or her sight to the number 8 to enter the second password number. After all the four password numbers have been entered, the user gaze direction moves to an enter button B6 beside the password field B5, and then the user enters the password as soon as the stay time exceeds a predetermined value (as shown in FIG. 9-5.). At this point in time, a password confirmation module 35 compares the authentication-oriented input information formed by the entered password with the user authentication information stored in the database 48. When the comparison is affirmative, the password confirmation module 35 sends a control signal to the user authentication apparatus 1A.

Another specific embodiment is described below with reference to FIG. 10, and FIG. 11-1 through FIG. 11-5.

Initially, the graphic password setting module 44 provides a graphic password setting menu M1 (shown in FIG. 5) to be displayed on the display interface 21 for the user to select an intended password so as to form the authentication-oriented input information. The graphic password setting menu M1 comprises a plurality of objects C1. In this embodiment, the objects C1 are graphics indicative of animals and weather. The user enters a password by watching at the objects C1. The entered password string is displayed in a password field C2 at the top of the graphic password setting menu M1. After all the passwords have been entered, the user moves the gaze direction to an enter button C3 beside the password field C2 and stores the password as the user authentication information, thereby finalizing the password setting process.

Upon completion of the password setting process, the passwords are set, by the graphic password setting module 44, to be the user authentication information and stored in the database 48 of the memory device ME. When the user authentication apparatus 1A starts in a subsequent operating session, the graphic authentication menu M2 is displayed to prompt the user to enter related authentication-oriented input information.

The graphic authentication menu M2, as shown in FIG. 11-1 through FIG. 11-5, displays a grassland background. The grassland background contains a plurality of dynamic graphics C4 indicative of animals and weather categories. The dynamic graphics C4 indicative of animals and weather categories move at random in the grassland background and thus change their current positions, thereby generating a visually dynamic effect.

To enter a password, the user must ensure that his or her gaze direction moves together with the related animal or weather graphics, while the timing module 43 is counting the stay time of the gaze direction. When the user's stay time exceeds a predetermined value, the user enters the related dynamic object C4 indicative of animals and weather to a display field C5. The user's sight must follow the dynamic graphics C4 and thus the gaze direction cannot precisely stay with a related dynamic graphic C4; this disadvantage can be avoided, if the user gaze direction (cursor) moves to a related dynamic graphic C4, and the graphic producing module 45 is configured to allow the dynamic graphic C4 to temporarily stop moving until the user's sight moves away from the dynamic graphic C4. For example, if the user enters a password string "rabbit-pig-cloud-sun," the user moves his or sight to the rabbit as shown in FIG. 11-1 until the password is confirmed. Then, the user enters the password into the display field C5 such that the display field C5 displays a graphic indicative of a rabbit for the user to confirm that the first password has been entered. After the first password has been entered, the user moves his or her sight to another dynamic graphic C4 indicative of a pig and then enters the password (as shown in FIG. 11-2.) After all the four passwords have been entered, the user gaze direction moves to an enter button C6 below the display field C5. When the stay time exceeds a predetermined value, the user finishes entering the password (as shown in FIG. 11-5.) At this point in time, the graphic authentication module 46 compares the authentication-oriented input information with the user authentication information stored in the database 48. When the comparison is affirmative, the graphic authentication module 46 sends a control signal to the user authentication apparatus 1A.

Another specific embodiment is described below with reference to FIG. 12, and FIG. 13-1 through FIG. 13-5.

Initially, the graphic password setting module 44 provides a graphic password setting menu K1 (shown in FIG. 7) to be displayed on the display interface 21 for the user to select an intended password. The graphic password setting menu K1 comprises a plurality of objects D1. In this embodiment, the objects D1 are patterns which differ in texture. In a variant preferred embodiment, the objects D1 indicate different colors, numbers, or text. The user enters a password by watching at the objects D1. The entered password string is displayed in a password field D2 at the top of the graphic password setting menu K1. After all the passwords have been entered, the user moves the gaze direction to an enter button D3 beside the password field D2 and stores the passwords as the user authentication information, thereby finalizing the password setting process.

Upon completion of the password setting process, the passwords are set, by the graphic password setting module 44, to be the user authentication information and stored in the database 48 of the memory device ME. When the user authentication apparatus 1A starts in a subsequent operating session, the graphic authentication menu K2 is displayed to prompt the user to enter a related password.

Figures 1, 13:
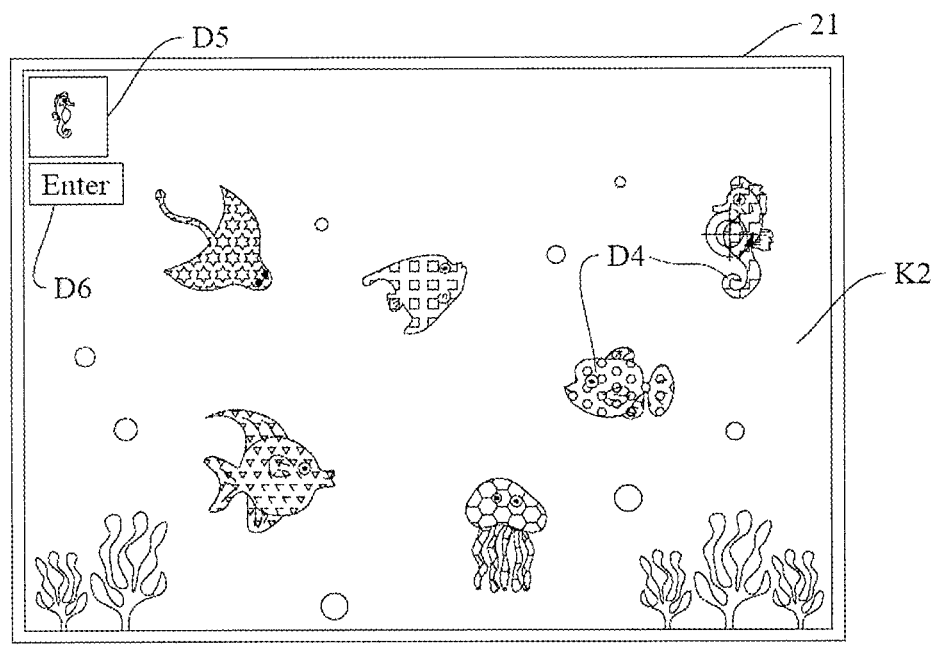
Figures 2, 13:
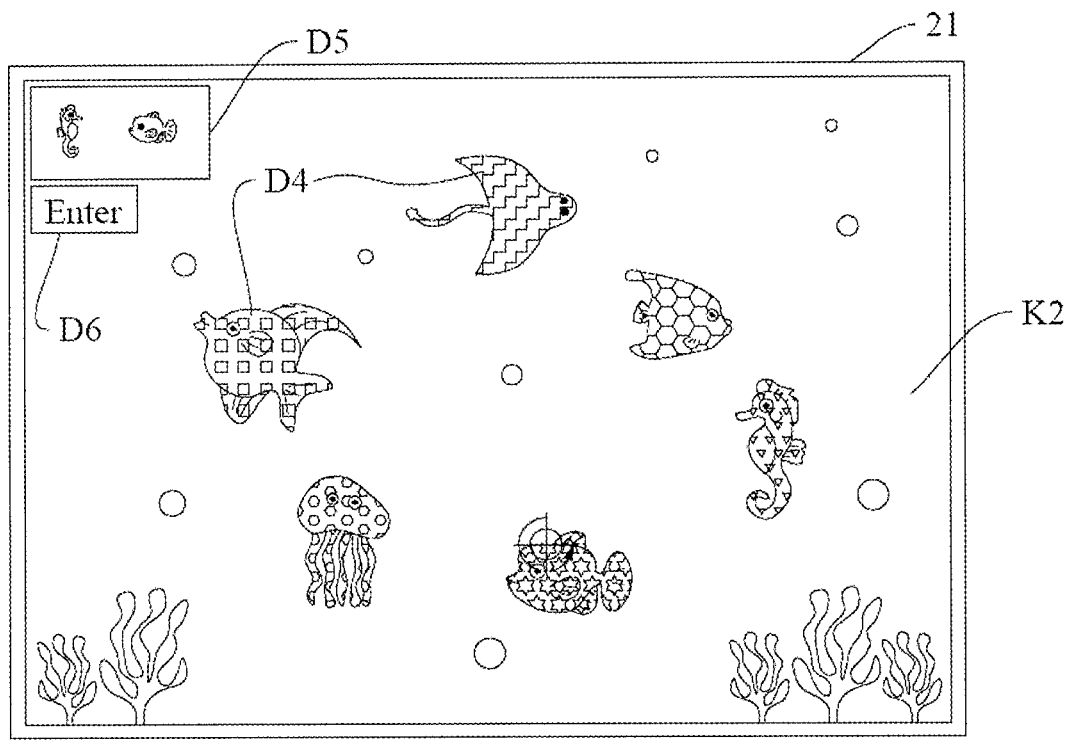
Figures 3, 13:
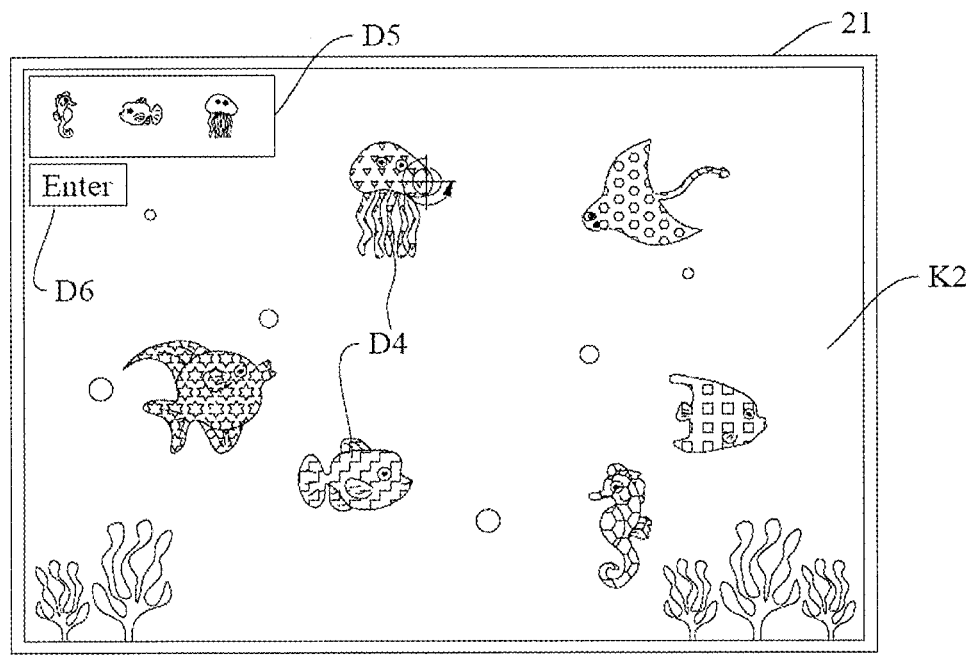
Figures 4, 13:
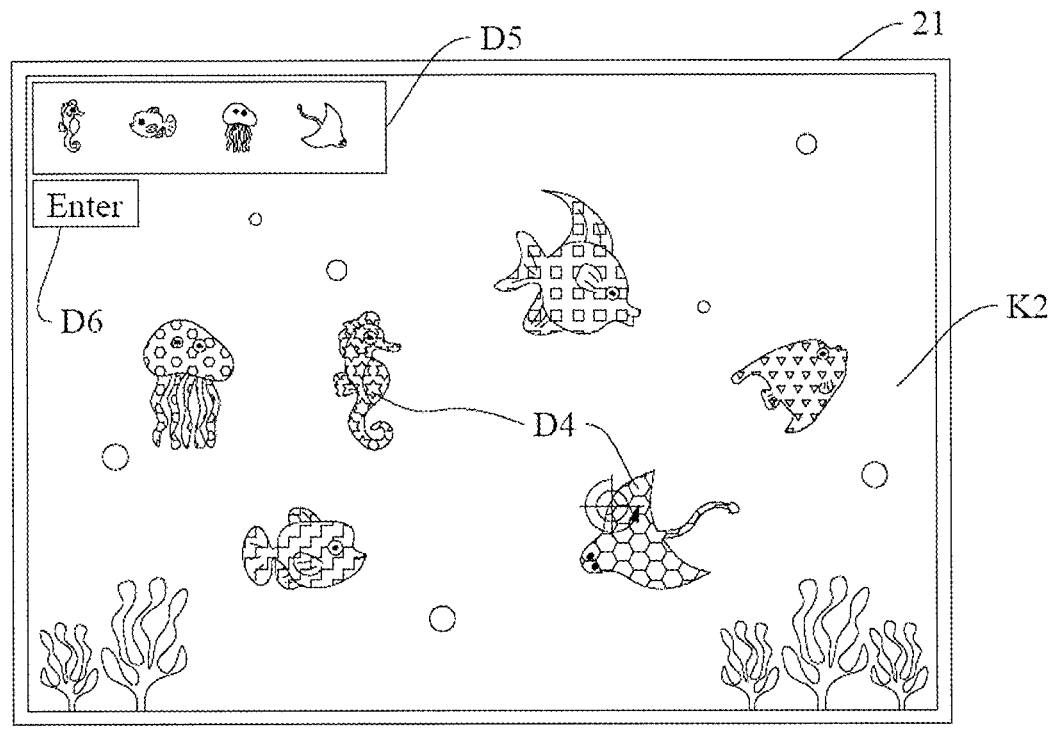
Figures 5, 13:
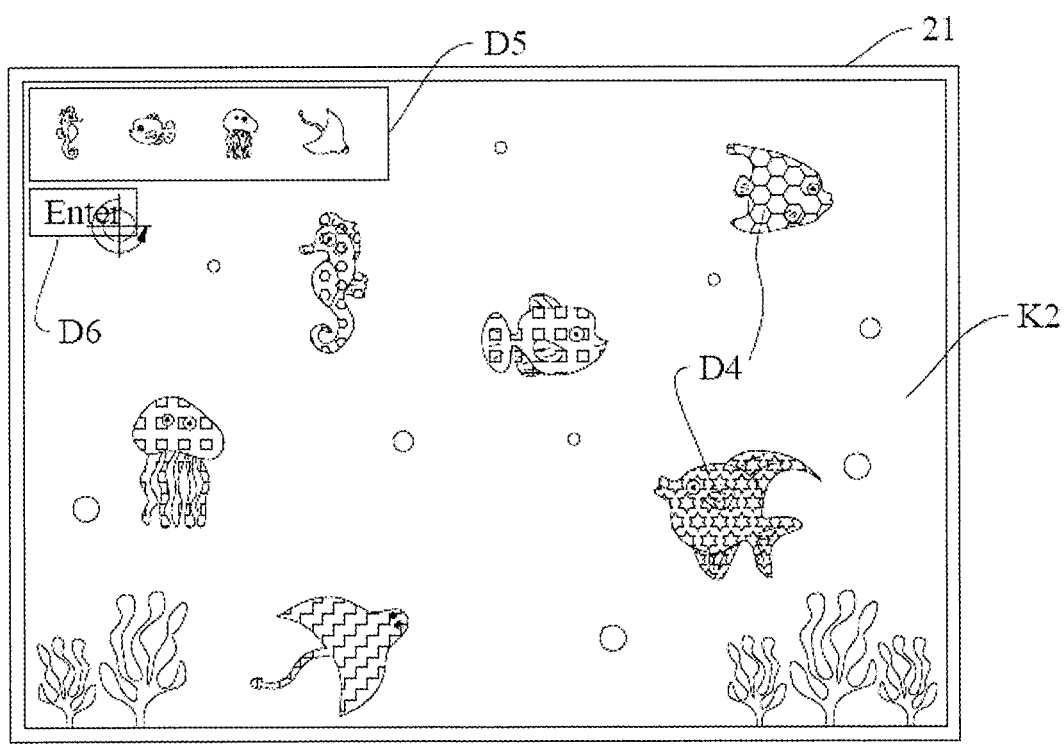

The graphic authentication menu K2, as shown in FIG. 13-1 through FIG. 13-5, displays an ocean background. The ocean background contains dynamic graphics D4 indicative of different fishes which move around in the background. The different fishes move in the ocean background at random. The fishes display patterns of different objects, respectively. The patterns of the fishes swap at a time interval. After the swap, the fishes still differ in terms of patterns, so as to maintain a one-to-one relationship between patterns and fishes. The movement of the fishes and the swap of patterns together produce a visually dynamic effect and further reduce the likelihood of password cracking.

To enter the authentication-oriented input information, the user must ensure that his or her gaze direction moves together with the related fishes, while the timing module 43 is counting the stay time of the gaze direction. When the user's stay time exceeds a predetermined value, the user enters the related dynamic graphic D4 indicative of fishes to a display field D5. In this embodiment, the display field D5 displays fishes rather than patterns with a view to preventing a third party from looking at the display field D5 stealthily in an attempt to record the user's password. Like the preceding embodiment, this embodiment overcomes a drawback of the prior art (the user gaze direction cannot precisely stay with a related dynamic graphic D4) because, in this embodiment, if the user gaze direction (cursor) moves to a related dynamic graphic D4, the graphic producing module 45 will temporarily stop the related dynamic graphic D4 from moving until the user's sight moves away from the dynamic graphic D4. In another preferred embodiment, if the user gaze direction stays with the dynamic graphic D4, the timing of the pattern swap will be suspended, so as to preclude erroneous password entering which might otherwise occur whenever the stay time exceeds the pattern swap time. For example, to enter a password string "stairs-dot-triangle-starlike," the user moves his or her sight to the seahorse with stairs patterns, as shown in FIG. 13-1, until the password is confirmed. Then, the user enters the password into a display field D5. The display field D5 displays a graphic indicative of a seahorse for the user to confirm that the first password has been entered. After the first password has been entered, the user moves his or her sight to a flatfish with starlike patterns and finishes entering the password (as shown in FIG. 13-2.) By the same token, after all the four passwords have been entered, the user gaze direction moves to an enter button D6 below the display field D5, and the user enters the passwords as soon as the stay time exceeds a predetermined value (as shown in FIG. 13-5.) The passwords form the authentication-oriented input information. At this point in time, the graphic authentication module 46 compares the authentication-oriented input information with the user authentication information stored in the database 48. When the comparison is affirmative, the graphic authentication module 46 sends a control signal to the user authentication apparatus 1A.

In addition to the embodiment, it is feasible that the user's passwords are set to a combination of fishes and patterns to thereby augment the difficulty in password cracking and prevent keylogging.

The eye-movement authentication method of the present invention is described below with reference to FIG. 14, which is a flow chart of an eye-movement authentication method of the present invention.

Figure 14:
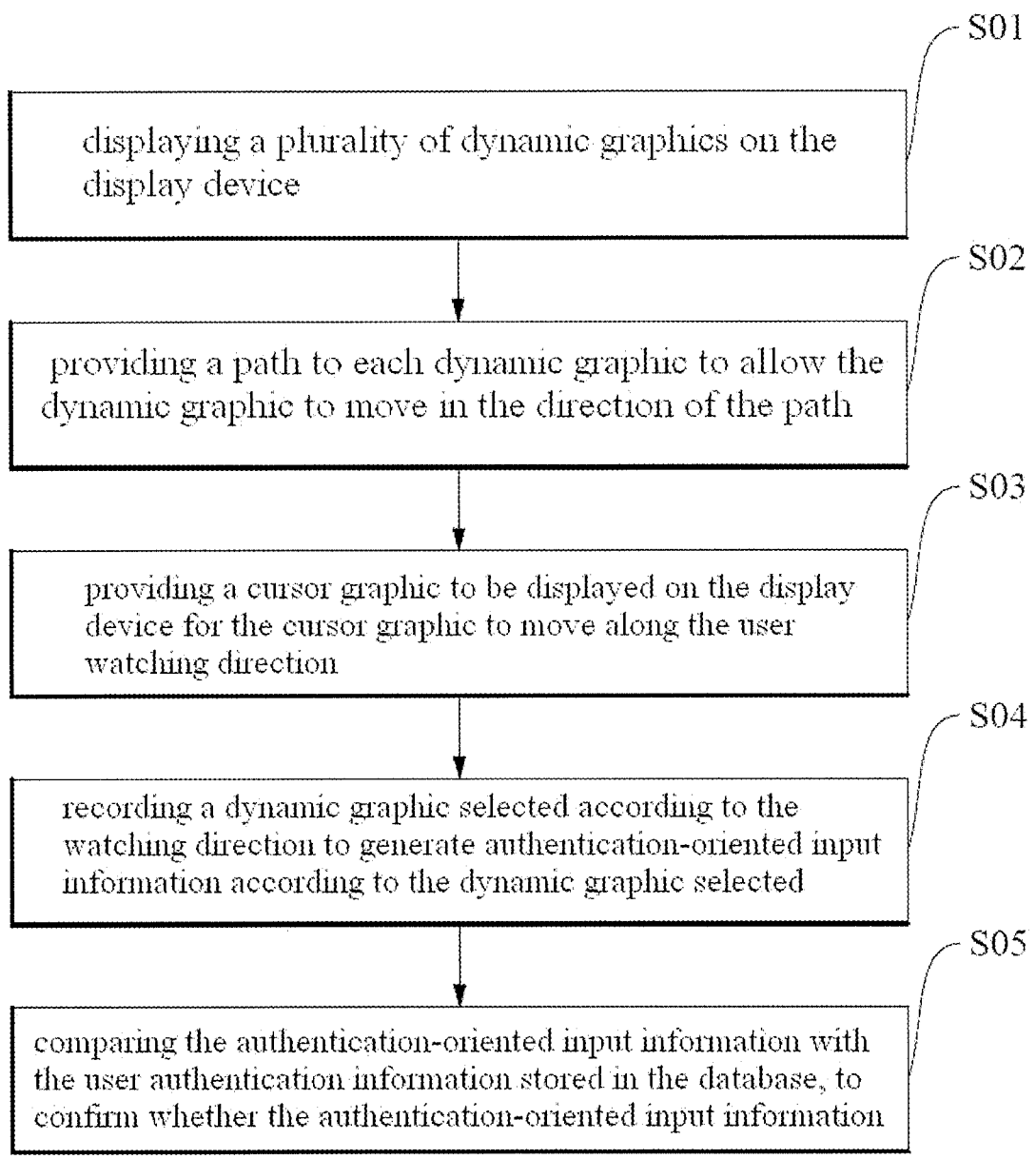
FIG. 14 is a flow chart of an eye-movement authentication method of the present invention.

Referring to FIG. 14, the eye-movement authentication method is applied in conjunction with the aforesaid eye-movement authentication system 100. The eye-movement authentication method comprises the steps as follows:

The graphic producing module 45 takes out a plurality of objects corresponding to user authentication information according to the content of the database 48, so as to display a plurality of dynamic graphics on the display device 20 (step S01).

During the process of generating the dynamic graphics, the graphic producing module 45 provides a regular or irregular path to each dynamic graphic to allow the dynamic graphic to move in the direction of the path, so as to form a graphic authentication menu (step S02).

To allow the user to enter a password, the graphic producing module 45 provides a cursor graphic to be displayed on the display device 20, so as for the cursor graphic to move along the user gaze direction (step S03). The user moves the cursor graphic through the gaze direction, so as to select a plurality of dynamic graphics shown on the graphic authentication menu.

When the user gaze direction stays with a dynamic graphic, the graphic authentication module 46 records a dynamic graphic selected according to the gaze direction to generate authentication-oriented input information according to the dynamic graphic selected (step S04). When the timing function starts, the graphic authentication module 46 generates a timing graphic for displaying the watching time, thereby allowing the user to confirm the watching time.

Finally, the graphic authentication module 46 compares the authentication-oriented input information with the user authentication information stored in the database 48, to confirm whether the authentication-oriented input information matches the user authentication information. When the confirmation is affirmative, the graphic authentication module 46 sends a control signal to the user authentication apparatus A1 to start a related process (step S05).

The eye-movement authentication method of the present invention is described below with reference to FIG. 15, FIG. 16, and FIG. 17, which are the flow chart (1), flow chart (2), and flow chart (3) of the eye-movement authentication method of the present invention.

Figure 15:
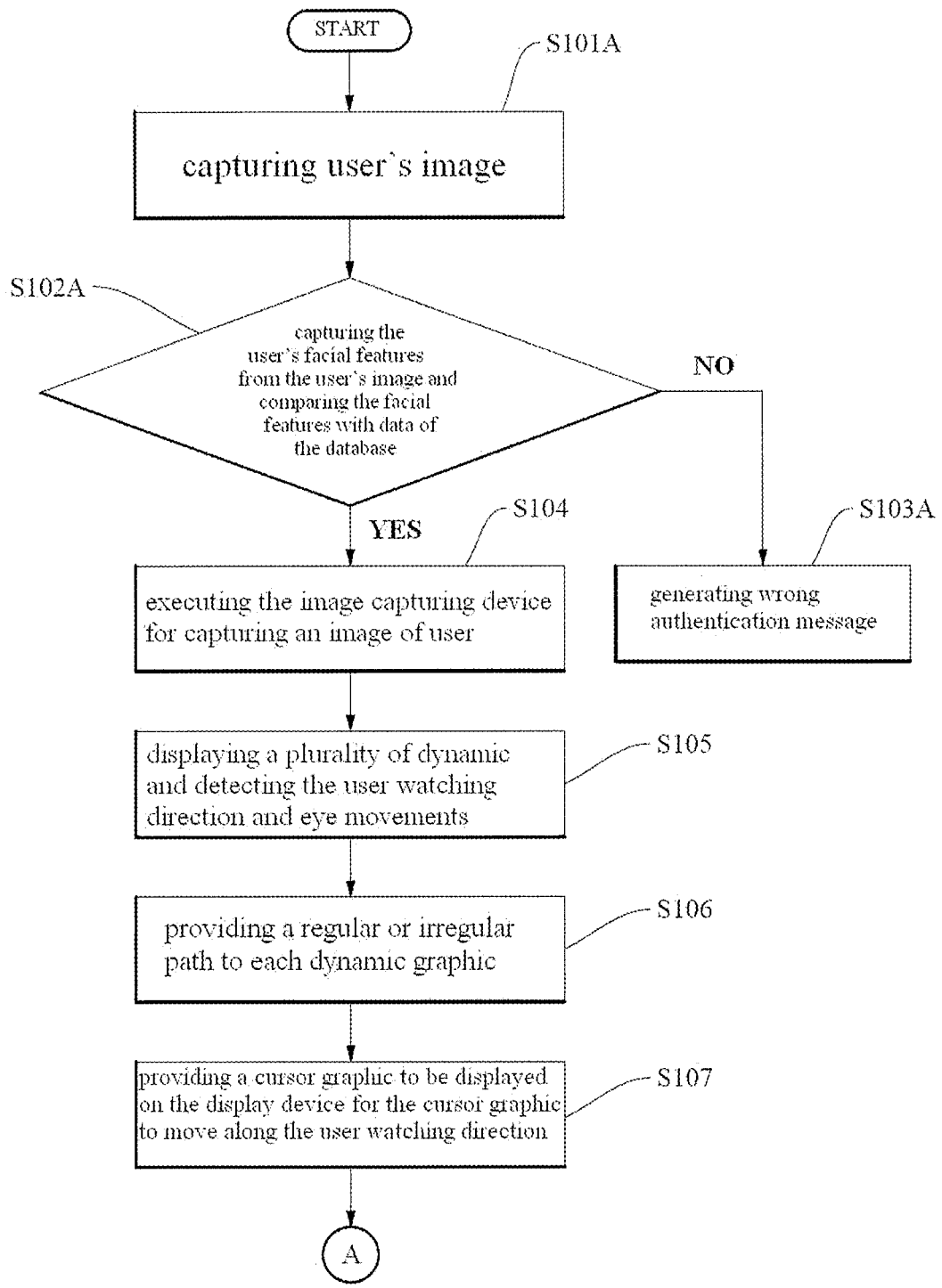
FIG. 15 is a flow chart (1) of the eye-movement authentication method of the present invention.
Figure 16:
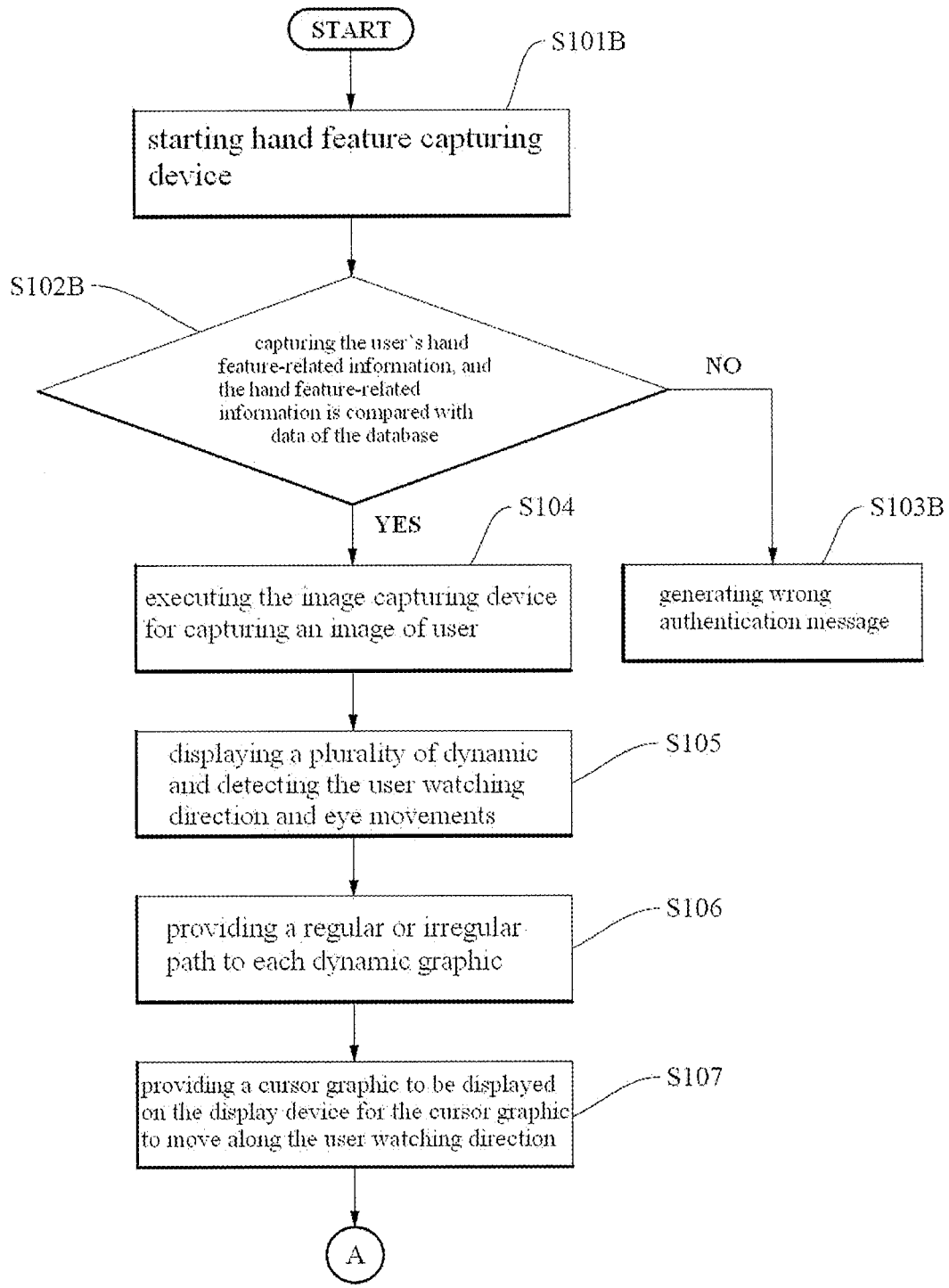
FIG. 16 is a flow chart (2) of the eye-movement authentication method of the present invention.
Figure 17:
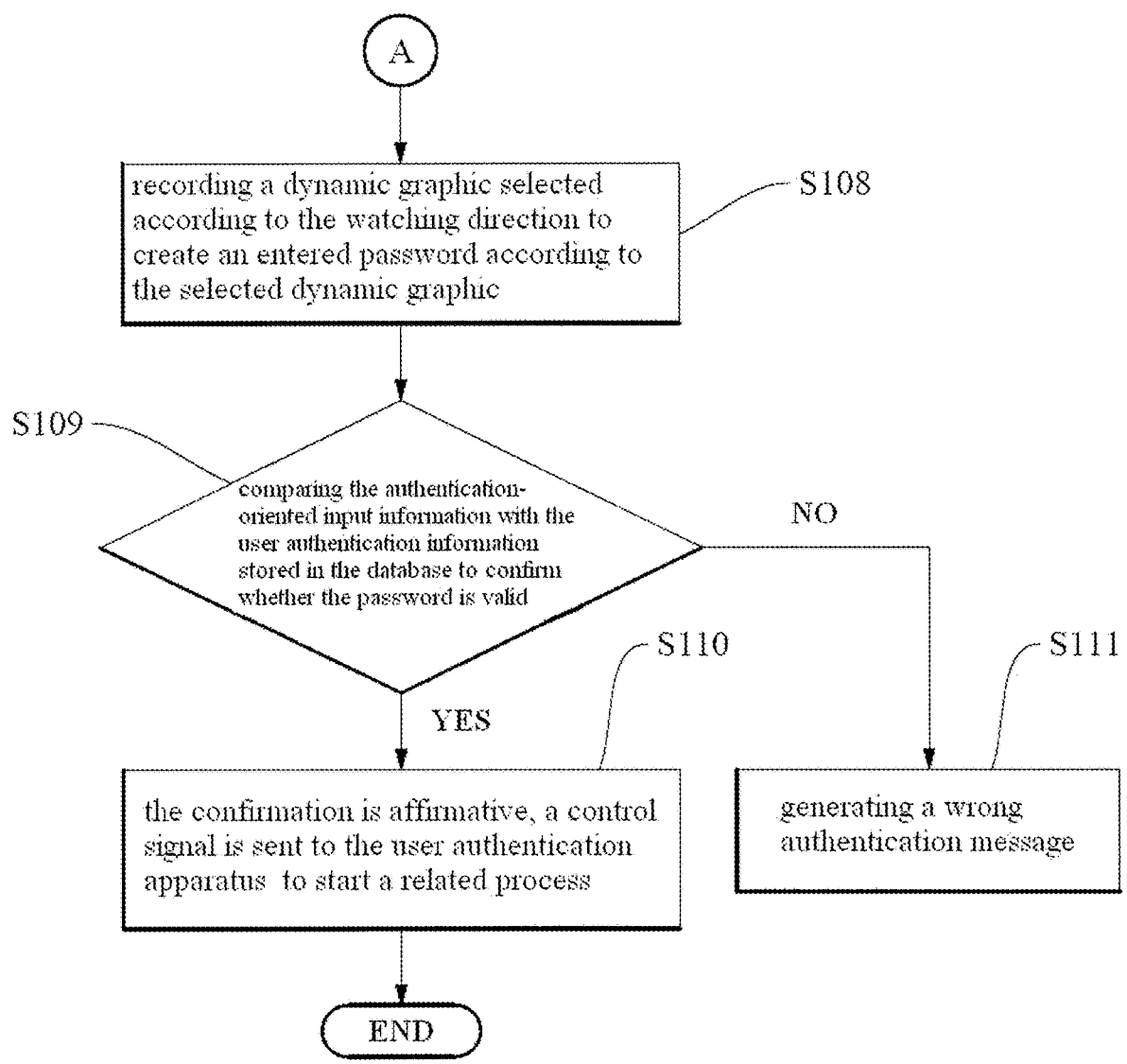
FIG. 17 is a flow chart (3) of the eye-movement authentication method of the present invention.

Referring to FIG. 15, FIG. 16, and FIG. 17, the eye-movement authentication method is applied in conjunction with the aforesaid eye-movement authentication system 100. The eye-movement authentication method comprises the steps as follows:

After the eye-movement authentication apparatus has started, the eye-movement authentication apparatus actuates an image capturing device for capturing the user's image (step S101A).

Afterward, referring to FIG. 15, the eye-movement authentication apparatus captures the user's facial features from the user's image and compares the facial features with data of the database 48, so as to confirm the user's identity (step S102A). After related user-related data is found, step S104 is executed. If no related user-related data is found, a wrong authentication message will be generated to thereby lock the eye-movement authentication apparatus and preclude user access (step S103A). The facial features are iris-related features of the iris region in the user's eye-related image, or face profile, relative positions of facial features, and facial protuberances shown in the user's face-related image, or blood vessel distribution features of the sclera region in the user's eye-related image. In another preferred embodiment, the user's image authentication is configured to be executed after the passwords have been entered, but the present invention is not limited thereto.

In another preferred embodiment shown in FIG. 16, after the eye-movement authentication apparatus has started, the hand feature capturing device starts (step S101B). Then, the user's hand feature-related information is captured, and the hand feature-related information is compared with data of the database 48, so as to confirm the user's identity (step S102B). After related user-related data has been found, step S104 is executed. If no related user-related data is found, a wrong authentication message will be generated to thereby lock the eye-movement authentication apparatus and preclude user access (step S103B). In a preferred embodiment, the hand feature authentication process is executed after the passwords have been entered, but the present invention is not limited thereto.

One of the facial feature authentication process and the hand feature authentication process is executed or carried out to the same product, but the present invention is not limited thereto.

After related user-related data has been found, the eye-movement authentication apparatus starts an image capturing device for capturing the user's image (step S104).

The graphic producing module 45 takes out a plurality of objects corresponding to passwords according to the content of the database 48 such that the objects can be selected by the user, so as to display a plurality of dynamic graphics on the display device 20 and detect the user gaze direction and eye movements (step S105).

During the process of generating the dynamic graphics, the graphic producing module 45 provides a regular or irregular path to each dynamic graphic to allow the dynamic graphic to move in the direction of the path, so as to form a graphic authentication menu (step S106).

To allow the user to enter a password, the graphic producing module 45 provides a cursor graphic to be displayed on the display device 2, so as for the cursor graphic to move along the user gaze direction (step S107). The user moves the cursor graphic through the gaze direction, so as to select a plurality of dynamic graphics shown on the graphic authentication menu.

When the user gaze direction stays with a dynamic graphic, the graphic authentication module 46 records a dynamic graphic selected according to the gaze direction to create an entered password according to the selected dynamic graphic (step S108). When the timing function starts, the graphic authentication module 46 generates a timing graphic for displaying the watching time, thereby allowing the user to confirm the watching time.

Finally, the graphic authentication module 46 compares the authentication-oriented input information with the user authentication information stored in the database 48, so as to confirm whether the password is valid (step S09). When the confirmation is affirmative, the graphic authentication module 46 sends a control signal to the user authentication apparatus 1A to start a related process (step S110). If the continuation is negative, the graphic authentication module 46 will generate a wrong authentication message (step S111).

Figure 18:
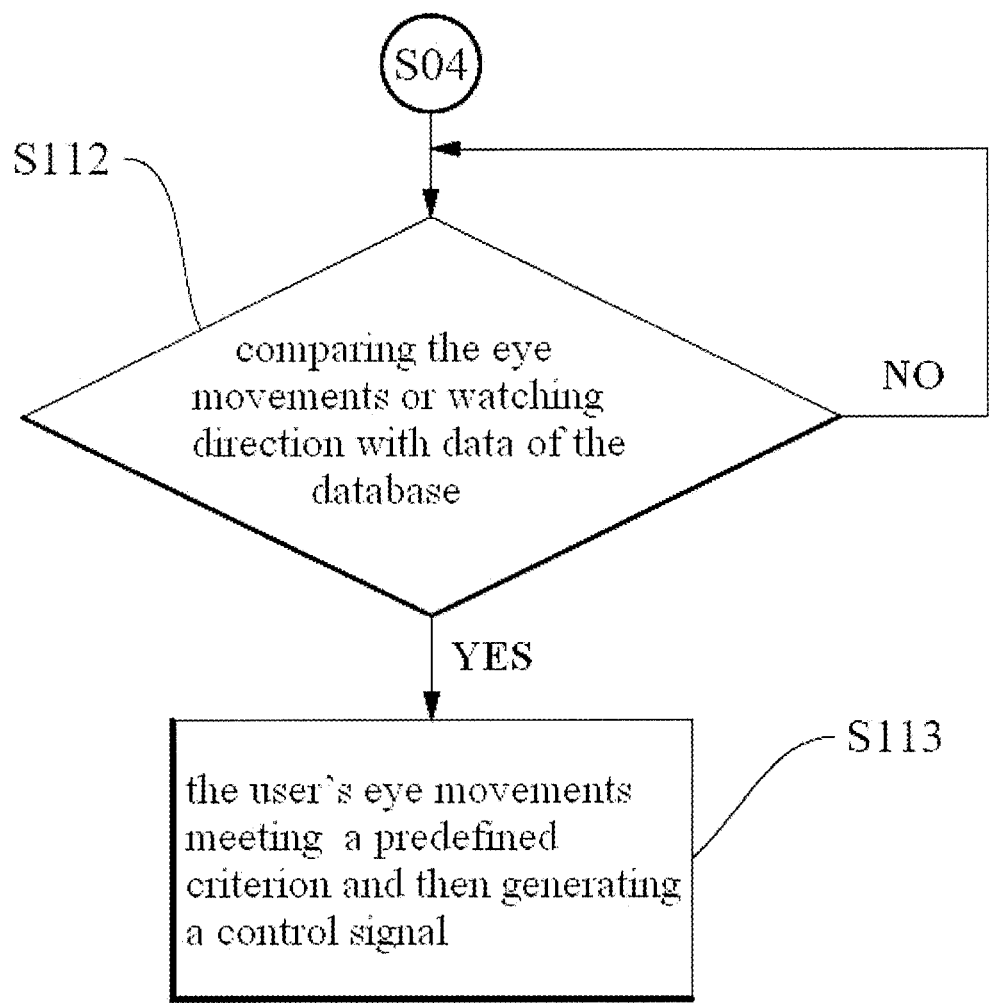
FIG. 18 is a flow chart (4) of the eye-movement authentication method of the present invention.

The eye-movement authentication method of the present invention entails providing a graphical interface or hidden interface for the user to watch at and enter data into. The graphical interface or hidden interface allows the user's eye movements or gaze direction to be obtained, so as to confirm, according to the user's eye movements or gaze direction, whether the user is operating self-volitionally. Referring to FIG. 18, in a preferred embodiment, during the process of executing the aforesaid graphic authentication, the hidden interface is executed behind the scene to compare the eye movements or gaze direction with data of the database (step S112) such that a control signal is generated when it is determined that the user's eye movements meet a predefined criterion (step S113).

In another preferred embodiment, before the graphic authentication process (step S105) but after the graphic authentication process (step S109), or during the graphic authentication process, a graphical interface is provided at random to request, in an enquiry-response manner, the user to give a response to a question posed on the graphical interface. Depending on the response given by the user to the question, it is feasible to confirm whether the user is operating a menu self-volitionally and generate a related control signal upon determination that the user is operating the menu but not self-volitionally.

The steps of the method are executed by a computer-readable medium. The computer-readable medium is, for example, read-only memory, flash memory, floppy disk, hard disk drive, compact disk, USB flash drive, magnetic tape, network-accessible database, or functionally-equivalent storage medium which persons skilled in the art can easily think of. The method is implemented when executed by related programs loaded onto a computer.

In addition to the computer-readable medium, the steps of the method can be implemented when presented in the form of a computer program product, which is stored on the hard disk drive or memory device of a network-based server, such as App Store, Google Play, windows Store, or any other similar platforms for online distribution of applications, to upload the computer program product to the server such that the user can pay for and download it.

In conclusion, the present invention is characterized in that passwords are entered by dynamic graphics to overcome a drawback of the prior art, that is, the conventional eye-movement techniques are predisposed to password divulgement because eye-movement paths are susceptible to keylogging. Furthermore, the present invention enables users to enter passwords through dynamic graphics to reduce the chance that third parties will guess the passwords right.

The above is the detailed description of the present invention. However, the above is merely the preferred embodiment of the present invention and cannot be the limitation to the implement scope of the present invention, which means the variation and modification according the present invention may still fall into the scope of the invention.

What is claimed is:

1. A dynamic graphic eye-movement authentication system, comprising:
an image capturing device captures images of a user's eyes;
a display device provides a display interface to the user; and
a control unit obtains the user's gaze from the images and provides a plurality of dynamic graphics on the display interface for the user to gaze, and the control unit randomly generates a path for the dynamic graphic to constantly move along on the display interface, and the control unit obtains the eye image from the image capturing device to calculate and further obtain a gazing projection point on the display device, and the control unit generates an authentication password by selecting the dynamic graphic and compares the authentication password to a predefined user's password from a database to obtain an authentication result, wherein the gazing projection point is the projection point from the user's gaze onto the display as the control unit detects that the gazing projection point moves to the dynamic graphic, the control unit allows the dynamic graphic to temporarily stop moving until the gazing projection point moves away from the dynamic a graphic and starts to perform timing to confirm entry of one password character corresponding to the dynamic graphic being watched at when a watching time exceeds a predetermined value, the control unit records one or plurality of the password characters to obtain the authentication password.

2. A dynamic graphic eye-movement authentication system using face authentication, comprising:
an image capturing device captures an image of a user;
a display device provides a display interface to the user; and
a control unit obtains the user's image with facial features from the image capturing device and compares the facial features with data from a user authentication information in an authentication database, so as to verify the user's identity, wherein the control unit also obtains the user's gaze from the images and provides a plurality of dynamic graphics on the display interface for the user to gaze, and the control unit randomly generates a path for the dynamic graphic to constantly move along on the display interface, and the control unit obtains the eye image from the image capturing device to calculate and further obtain a gazing projection point on the display device, and the control unit generates an authentication password by selecting the dynamic graphic and compares the authentication password to a predefined user's password from a database to obtain an authentication result, wherein the gazing projection point is the projection point from the user's gaze onto the display, as the control unit detects that the gazing projection point moves to the dynamic graphic, the control unit allows the dynamic graphic to temporarily stop moving until the gazing projection point moves away from the dynamic graphic, and starts to perform timing to confirm entry of one password character corresponding to the dynamic graphic being watched at when a watching tune exceeds a predetermined value, the control unit records one or plurality of the password characters to obtain the authentication password.

3. The eye-movement authentication system of claim 2, wherein the facial features include iris features in an iris region or blood vessel distribution features of a sclera region.

4. A dynamic graphic eye-movement authentication system using hand authentication, comprising:
an image capturing device captures images of a user;
a hand feature capturing device captures the user's hand feature-related information;
a display device provides a display interface; and
a control unit compares the hand feature-related information with data from a database, so as to verify the user's identity, wherein the control unit also obtains the user's gaze from the images and provides a plurality of dynamic graphics on the display interface for the user to gaze, and the control unit randomly generates a path for the dynamic graphic to constantly move along on the display interface, and the control unit obtains the eye image from the image capturing device to calculate and further obtain a gazing projection point on the display device, and the control unit generates an authentication password by selecting the dynamic graphic and compares the authentication password to a predefined user's password from a database to obtain an authentication result, wherein the gazing projection point is the projection point from the user's gaze onto the display, as the control unit detects that the gazing projection point moves to the dynamic graphic, the control unit allows the dynamic graphic to temporarily stop moving until the gazing projection point moves away from the dynamic graphic, and starts to perform timing to confirm entry of one password character corresponding to the dynamic graphic being watched at when a watching time exceeds a predetermined value, the control unit records one or plurality of the password characters to obtain the authentication password.

5. The eye-movement authentication system of claim 4, wherein the hand feature-related information includes fingerprint feature-related information or palm feature-related information.

6. The eye-movement authentication system of claim 4, wherein the control unit provides a graphical interface or hidden interface on the display device to the user and obtains the user's eye movements or gaze direction, wherein the control unit determines whether the user is self-volitional behavior according to the user's eye movements or gaze direction.

7. The eye-movement authentication system of claim 4, wherein the dynamic graphic moves along a regular or irregular path provided from the control unit.

8. The eye-movement authentication system of claim 4, wherein the dynamic graphic includes numbers, text, graphics, and a combination thereof.

9. The eye-movement authentication system of claim 4, wherein the control unit displays a plurality of objects on the display device, with each said object corresponding to the dynamic graphic, such that the user configures the user authentication password by selecting the plurality of objects and stores the user authentication password in the database.

10. A dynamic graphic eye-movement authentication method, comprising the steps of:
   a display device displays a plurality of dynamic graphics; and
   a control unit provides a plurality of dynamic graphics on the display interface of the display device for the user to gaze and randomly generates a path for the dynamic graphic to constantly move along on the display interface; in meanwhile of the above steps, the control unit also obtains the eye image from the image capturing device to calculate and further obtain a gazing projection point on the display device and provides a cursor graphic on the display device to correspond to a user's gaze, and the control unit determines the user's gaze according to directions or paths of movements of the user's eyeballs to recognize the gazing projection point on the display device, as the control unit detects that the gazing projection point moves to the dynamic graphic, the control unit allows the dynamic graphic to temporarily stop moving until the gazing projection point moves away from the dynamic graphic, and starts to perform timing to confirm entry of one password character corresponding to the dynamic graphic being watched at when a watching time exceeds a predetermined value, the control unit records one or plurality of the password characters to obtain an authentication password, and the control unit compares the authentication password to a predefined user's password from a database to obtain an authentication result, wherein the gazing projection point is the projection point from the user's gaze onto the display.

11. A dynamic graphic eye-movement authentication method using face authentication, comprising the steps of:
   an image capturing device captures a user's image; and
   a control unit captures the user's facial features from the image capturing device and compares the facial features with data from a database to confirm the user's identity, so as to verify the user's identity; in meanwhile of the above steps, the control unit also provides a plurality of dynamic graphics on the display interface of the display device for the user to gaze and randomly generates a path for the dynamic graphic to constantly move along on the display interface, and the control unit obtains the eye image from the image capturing device to calculate and further obtain a gazing projection point on the display device and provides a cursor graphic on the display device to correspond to a user's gaze, and the control unit determines the user's gaze according to directions or paths of movements of the user's eyeballs to recognize the gazing projection point on the display device, as the control unit detects that the gazing projection point moves to the dynamic graphic, the control unit allows the dynamic graphic to temporarily stop moving until the gazing projection point moves away from the dynamic graphic, and starts to perform timing to confirm entry of one password character corresponding to the dynamic graphic being watched at when a watching time exceeds a predetermined value, the control unit records one or plurality of the password characters to obtain an authentication password, and the control unit compares the authentication password to a predefined user's password from a database to obtain an authentication result, wherein the gazing projection point is the projection point from the user's gaze onto the display.

12. The eye-movement authentication method of claim 11, wherein the facial features includes iris features in an iris region or blood vessel distribution features of a sclera region.

13. A dynamic graphic eye-movement authentication method using hand authentication, comprising the steps of:
   a hand feature capturing device captures a hand feature-related information of a user;
   an image capturing device captures the user's image; and
   a control unit compares the hand feature-related information with data from a database to confirm the user's identity, so as to verify the user's identity and captures an eye-related image from the user's image from the image capturing device and calculates user gaze direction and eye movements according to the eye-related image; in meanwhile of the above steps, the control unit also provides a plurality of dynamic graphics on the display interface of the display device for the user to gaze and randomly generates a path for the dynamic graphic to constantly move along on the display interface, and the control unit obtains the eye image from the image capturing device to calculate and further obtain a gazing projection point on the display device and provides a cursor graphic on the display device to correspond to a user's gaze, and the control unit determines the user gaze direction according to directions or paths of movements of the user's eyeballs to recognize the gazing projection point on the display device, as the control unit detects that the gazing projection point moves to the dynamic graphic, the control unit allows the dynamic graphic to temporarily stop moving until the gazing projection point moves away from the dynamic graphic, and starts to perform timing to confirm entry of one password character corresponding to the dynamic graphic being watched at when a watching time exceeds a predetermined value, the control unit records one or plurality of the password characters to obtain an authentication password, and the control unit compares the authentication password to a predefined user's password from a database to obtain an authentication result, wherein the gazing projection point is the projection point from the user's gaze onto the display.

14. The eye-movement authentication method of claim 13, wherein the hand feature-related information comprises fingerprint feature-related information or palm feature-related information.

15. The eye-movement authentication method of claim 13, wherein the step further involves providing a graphical interface or hidden interface for the user to watch at and enter data into and obtaining the user's eye movements or gaze direction so as to confirm, according to the user's eye movements or gaze direction, whether the user is operating volitionally.

16. The eye-movement authentication method of claim 13, wherein the dynamic graphic moves according to a regular or irregular path.

17. The eye-movement authentication method of claim 13, wherein the dynamic graphic contains one of numbers, text, graphics, and a combination thereof.

* * * * *